United States Patent
Rosenberg et al.

(10) Patent No.: US 9,053,115 B1
(45) Date of Patent: *Jun. 9, 2015

(54) QUERY IMAGE SEARCH

(75) Inventors: Charles J. Rosenberg, Cupertino, CA (US); Jingbin Wang, Mountain View, CA (US); Sarah Moussa, Mountain View, CA (US); Erik Murphy-Chutorian, Palo Alto, CA (US); Andrea Frome, Berkeley, CA (US); Yoram Singer, Palo Alto, CA (US); Radhika Malpani, Palo Alto, CA (US)

(73) Assignee: Google Inc., Mountain View, CA (US)

( * ) Notice: Subject to any disclaimer, the term of this patent is extended or adjusted under 35 U.S.C. 154(b) by 81 days.

This patent is subject to a terminal disclaimer.

(21) Appl. No.: 13/592,850

(22) Filed: Aug. 23, 2012

Related U.S. Application Data

(63) Continuation of application No. 12/763,466, filed on Apr. 20, 2010, now Pat. No. 8,429,173.

(60) Provisional application No. 61/171,000, filed on Apr. 20, 2009.

(51) Int. Cl.
G06F 17/30 (2006.01)

(52) U.S. Cl.
CPC ........ *G06F 17/301* (2013.01); *G06F 17/30247* (2013.01)

(58) Field of Classification Search
None
See application file for complete search history.

(56) References Cited

U.S. PATENT DOCUMENTS

| | | |
|---|---|---|
| 6,728,752 B1 | 4/2004 | Chen |
| 6,744,935 B2 | 6/2004 | Choi |
| 6,748,398 B2 | 6/2004 | Zhang |
| 6,834,288 B2 | 12/2004 | Chen |
| 6,901,411 B2 | 5/2005 | Li |
| 6,941,321 B2 | 9/2005 | Schuetze |
| 7,043,474 B2 | 5/2006 | Mojsilovic |
| 7,430,566 B2 | 9/2008 | Li |
| 7,460,735 B1 | 12/2008 | Rowley et al. |
| 7,478,091 B2 | 1/2009 | Mojsilovic |

(Continued)

OTHER PUBLICATIONS

U.S. Appl. No. 12/763,489, filed Apr. 20, 2010, Query Image Search, Rosenberg et al.

(Continued)

*Primary Examiner* — Son T Hoang
(74) *Attorney, Agent, or Firm* — Fish & Richardson P.C.

(57) ABSTRACT

Methods, systems and apparatus for identifying result images for a query image. One or more labels that are associated with the query image are obtained. Candidate images matching the query labels are identified. Visual similarity scores are generated for the candidate images. Each visual similarity score represents the visual similarity of a respective candidate image to the query image. Relevance scores are generated for each of the candidate images based on the visual similarity scores. Each relevance score represents a measure of relevance of the respective candidate images to the query image. The candidate images are ranked based on the relevance scores, a highest ranking subset of the candidate images being identified as result images and referenced by image search results. The result images can be candidate images that satisfy a similarity condition relative to the query image and other result images.

15 Claims, 10 Drawing Sheets

(56) References Cited

U.S. PATENT DOCUMENTS

| | | |
|---|---|---|
| 7,519,236 B2 | 4/2009 | Cheng |
| 7,627,556 B2 | 12/2009 | Liu et al. |
| 7,707,132 B2 | 4/2010 | Xie |
| 7,907,755 B1 | 3/2011 | Perlmutter |
| 7,962,500 B2 | 6/2011 | van Zwol et al. |
| 8,171,043 B2 | 5/2012 | Murdock et al. |
| 2002/0143769 A1 | 10/2002 | Tecu et al. |
| 2002/0188602 A1 | 12/2002 | Stubler et al. |
| 2003/0074369 A1 | 4/2003 | Schuetze |
| 2003/0187844 A1 | 10/2003 | Li et al. |
| 2004/0049734 A1 | 3/2004 | Simske |
| 2004/0267693 A1 | 12/2004 | Lowe et al. |
| 2007/0019864 A1* | 1/2007 | Koyama et al. ............... 382/218 |
| 2007/0143272 A1* | 6/2007 | Kobayashi ........................ 707/3 |
| 2007/0214114 A1 | 9/2007 | Liu et al. |
| 2008/0046424 A1* | 2/2008 | Horton .............................. 707/6 |
| 2008/0126345 A1 | 5/2008 | Podilchuk |
| 2008/0133585 A1 | 6/2008 | Vogel et al. |
| 2009/0063455 A1 | 3/2009 | Li et al. |
| 2009/0179794 A1 | 7/2009 | Dooley et al. |
| 2009/0208097 A1 | 8/2009 | Husseini et al. |
| 2009/0254539 A1* | 10/2009 | Wen et al. ......................... 707/5 |
| 2009/0290813 A1 | 11/2009 | He |
| 2009/0297050 A1 | 12/2009 | Li et al. |
| 2010/0064254 A1* | 3/2010 | Atsmon et al. ............... 715/810 |
| 2010/0074528 A1 | 3/2010 | Hu et al. |
| 2010/0088295 A1 | 4/2010 | Duan et al. |
| 2010/0158412 A1 | 6/2010 | Wang et al. |
| 2010/0166321 A1 | 7/2010 | Sawant et al. |
| 2011/0085739 A1 | 4/2011 | Zhang et al. |

OTHER PUBLICATIONS

Chum O. et al., "Total Recall: Automatic Query Expansion with a Generative Feature Model for Object Retrieval", [online] ICCVO7(1-8) [retrieved on Apr. 22, 2010], UTC from IEEE Xpore.

Cui J., et al., "Real Time Google and Live Image Search Re-ranking", ACM International Conference on Multimedia 2008, pp. 729-732, 2008.

Datta R. et al., "Image Retrieval: Ideas, Influences and Trends of the New Age", ACM Computing Surveys, vol. 40, No. 2, article 5, pp. 1-60, 2008.

Jegou H. et al., "A contextual dissimilarity measure for accurate and efficient image search", [online] CVPRO7(1-8) [retrieved on Apr. 22, 2010], UTC from IEEE Xplore.

Ruthven I., et al., "A survey on the use of relevance feedback for information access systems", [online] [retrieved on Apr. 22, 2010]. pp. 1-53. http:www.dcs.qmul.ac.uk/~mounia/CV/Papers/ker_ruthven_lalmas.pdf.

Frome A., "Image Retrieval and Classification Using Local Distance Functions", Proceedings of Neural Information Processing Systems (NIPS) pp. 417-424, 2006.

Veltkamp and Tanase, "Content-Based Image Retrieval Systems: A Survey" Technical Report UU-CS-2000-34, pp. 1-62, 2000.

Rosenberg, C, 'Query Image Search', U.S. Appl. No. 12/763,489, filed Apr. 20, 2010.

Wang et al. "ARISTA"—Image Search to Annotation of Billions of Web Photos, In Proc. IEEE Conf. Computer Vision Pattern Recognition, 2010, pp. 2987-2994 (8 pages).

\* cited by examiner

QUERY IMAGE SEARCH

CROSS-REFERENCE TO RELATED APPLICATIONS

This application is a continuation application of, and claims priority to, U.S. patent application Ser. No. 12/763,466, entitled Method, System, and Computer Readable Medium for Identifying Result Images Based on an Image Query, to inventors Rosenberg et al., which was filed on Apr. 20, 2010, which claims the benefit under 35 U.S.C. §119(e) of U.S. Patent Application No. 61/171,000, entitled "Query Image Search," filed Apr. 20, 2009. The disclosures of the foregoing applications are incorporated herein by reference in their entirety.

BACKGROUND

This specification relates to digital information retrieval, and particularly to processing search results.

The Internet provides access to a wide variety of resources such as video or audio files, web pages for particular subjects, book articles, or news articles. A search system can identify resources in response to a text query that includes one or more search terms or phrases. The search system ranks the resources based on their relevance to the query and on measures of quality of the resources and provides search results that link to the identified resources. The search results are typically ordered for viewing according to the rank.

To search image resources, a search system can determine the relevance of an image to a text query based on the textual content of the resource in which the image is located and also based on relevance feedback associated with the image. For example, an information retrieval score measuring the relevance of a text query to the content of a web page can be combined with a click through rate of an image presented on that web page to generate an overall search result score for the image.

Textual content associated with an image can often be a reliable indicator of a topic and/or subject matter to which the image is related. However, it is possible that images unrelated to the query may be identified in search results responsive to the query if the textual content mischaracterizes the content of the image or is otherwise unrelated to the image. Therefore, images may be identified in response to text queries that are unrelated to the topic specified by the text query.

Some search systems search image resources by using "query images" as input. A query image is an image, such as a jpeg file, that is used by a search engine as input to a search processing operation. Related images can be found by processing other images and identifying images that are similar in visual appearance to the query image. However, viewers interpret images in a much more subjective manner than text. Thus, while the images that are identified may be similar in appearance to the query image, many of the images may not be of interest to the viewer.

SUMMARY

In general, one aspect of the subject matter described in this specification can be implemented in methods that include the actions obtaining one or more query labels associated with a query image; identifying, in a data processing system, candidate images matching the query labels; generating, in the data processing system, visual similarity scores for the candidate images, each visual similarity score representing a visual similarity of a respective candidate image to the query image; generating, in the data processing system, relevance scores for the candidate images based on the visual similarity scores, each relevance score being a relevance measure of a respective candidate image to the query image; generating a ranking of the candidate images; and selecting a highest ranking subset of the candidate images to be referenced by image search results. This and other embodiments of this aspect include corresponding systems, apparatus, and computer program products.

Another aspect of the subject matter described in this specification can be implemented in methods that include the actions identifying one or more first labels for a query image; for each first label, identifying one or more images having at least one label matching the first label, each of the labels comprising text; for each of the images, determining, in a data processing system, a visual similarity score representing a visual similarity of the image relative to the query image; identifying, in the data processing system, a threshold number of the images having a visual similarity score that satisfies a visual similarity threshold; identifying candidate labels from labels of each of the threshold number of the images; identifying, in the data processing system, relevance scores for the candidate labels, each relevance score being a measure of relevance of the text of the respective candidate label to query image; and selecting, in the data processing system, second labels for the query image based on the relevance scores. This and other embodiments of this aspect include corresponding systems, apparatus, and computer program products.

Another aspect of the subject matter described in this specification can be implemented in methods that include the actions accessing image similarity feedback data for a query image, the image similarity feedback data specifying measures of similarity of training images relative to the query image; identifying, in a data processing system, image feature scores for the query image and the training images, each image feature score specifying a visual characteristic of a portion or an aspect of an image; for each image feature score, generating, in the data processing system, a feature distance being a distance from corresponding query image feature scores; training, in the data processing system, an image similarity model based on the similarity feedback data and the feature distances, the image similarity model being trained to identify one or more candidate images that are visually similar to the query image based on image feature scores of the one or more candidate images; generating a visual similarity score for a candidate image relative to the query image; and boosting the visual similarity score for the image when a common distinct set of image feature values is identified in the image and the query image. This and other embodiments of this aspect include corresponding systems, apparatus, and computer program products.

Another aspect of the subject matter described in this specification can be implemented in methods that include the actions accessing a plurality of images referenced by initial image search results responsive to a query image, each image having a visual similarity score that satisfies an initial similarity threshold, the visual similarity score being a measure of visual similarity of the image relative to the query image; identifying, in a data processing system, a first image from the plurality of images, the first image having a visual similarity score that satisfies a first similarity threshold, the first similarity threshold being more selective than the first similarity threshold; identifying, in the data processing system, a second image from the plurality of images, the second image satisfying a similarity condition, the similarity condition specifying a degree of similarity of the second image to the query image and a degree of similarity to the first image; and identifying, in the data processing system, the first image and the second image as result images for the query image, a result image being an image for which a reference to the image is identified as a final image search result for the query image. This and other embodiments of this aspect include corresponding systems, apparatus, and computer program products.

Another aspect of the subject matter described in this specification can be implemented in methods that include the actions accessing a plurality of images referenced by initial search results responsive to a query image, each of the images having a visual similarity score that satisfies an initial similarity threshold, the visual similarity score being a measure of visual similarity of the image relative to the query image; identifying a dominant image characteristic for the plurality of images, the dominant image characteristic being an image characteristic that is included in a threshold number of the plurality of images; filtering the plurality of images based on the dominant image characteristic; and identifying the filtered plurality of images as result images for the query image, a result image being an image for which a reference to the image is identified for inclusion as a final image search result for the query image. This and other embodiments of this aspect include corresponding systems, apparatus, and computer program products.

Particular embodiments of the subject matter described in this specification can be implemented so as to realize one or more of the following advantages. High confidence labels can be generated for a query image based on labels associated with images that are visually similar to the query image. Candidate images can be selected for a query image based on the high confidence labels to increase the likelihood that the candidate images are relevant to the query image. More subtle image similarities can be identified with an image similarity model that is trained based on similarity feedback data for visually similar images. Candidate images can be selected as result images for a query image based on a similarity condition that increases the likelihood that each candidate image is visually similar to the query image and other result images. More visually similar candidate images can be identified by filtering candidate images that do not include a dominant characteristic that is present in a minimum number of the candidate images.

The details of one or more embodiments are set forth in the accompanying drawings and the description below. Other features, aspects, and advantages of the invention will be apparent from the description and drawings, and from the claims.

DESCRIPTION OF DRAWINGS

Like reference symbols in the various drawings indicate like elements.

DETAILED DESCRIPTION

Figure 1A:
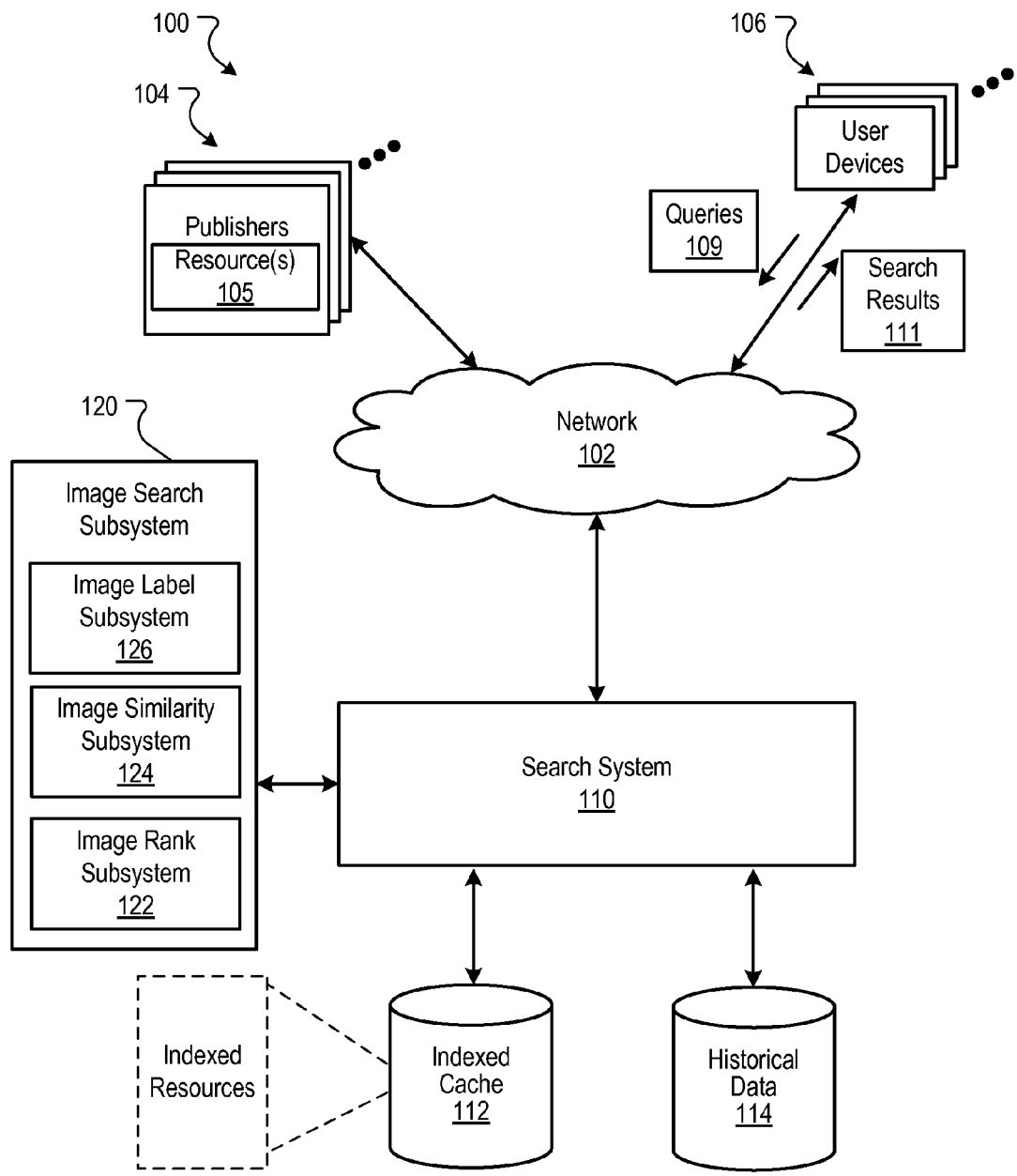
FIG. 1A is a block diagram of an example environment in which a search system provides search services.

FIG. 1A is a block diagram of an example environment 100 in which a search system 110 provides search services. The example environment 100 includes a network 102, e.g., a local area network (LAN), wide area network (WAN), the Internet, or a combination of them, connects publishers 104, user devices 106, and the search system 110. The environment 100 may include many thousands publishers 104 and user devices 106.

A web site 104 is one or more resources associated with a domain name and hosted by one or more servers. An example web site is a collection of web pages formatted in hypertext markup language (HTML) that can contain text, images, multimedia content, and programming elements, e.g., scripts. Each web site 104 is maintained by a publisher, e.g., an entity that manages and/or owns the web site.

A resource is any data that can be provided by the web site 104 over the network 102 and that is associated with a resource address. Resources include HTML pages, word processing documents, and portable document format (PDF) documents, images, video, and feed sources, to name just a few. The resources can include content, e.g., words, phrases, images and sounds and may include embedded information (e.g., meta information and hyperlinks) and/or embedded instructions (e.g., JavaScript scripts).

A user device 106 is an electronic device that is under control of a user and is capable of requesting and receiving resources over the network 102. Example user devices 106 include personal computers, mobile communication devices, and other devices that can send and receive data over the network 102. A user device 106 typically includes a user application, e.g., a web browser, to facilitate the sending and receiving of data over the network 102.

To facilitate searching of resources, the search system 110 identifies the resources by crawling and indexing the resources provided by the publishers 104. Data about the resources can be indexed based on the resource to which the data corresponds. The indexed and, optionally, cached copies of the resources are stored in an indexed cache 112.

The user devices 106 submit search queries 109 to the search system 110. In response, the search system 110 accesses the indexed cache 112 to identify resources that are relevant to the search query 109. The search system 110 identifies the resources generates search results 111 that identify the resources and returns the search results 111 to the user devices 106. A search result 111 is data generated by the search system 110 that identifies a resource that is responsive to a particular search query, and includes a link to the resource. An example search result 111 can include a web page title, a snippet of text or a portion of an image extracted from the web page, and the URL of the web page.

For a search of textual content, the search results are ranked based on scores related to the resources identified by the search results, such as information retrieval ("IR") scores, and optionally a quality score of each resource relative to other resources. In some implementations, the IR scores are computed from dot products of feature vectors corresponding to a search query 109 and a resource, and the ranking of the search results is based on relevance scores that are a combination (e.g., sums, products, or other mathematical combinations) of the IR scores and quality scores. The search results 111 are ordered according to these relevance scores and provided to the user device according to the order.

For a search directed to images that uses a text query as input, the search system 110 can combine the relevance score of a resource with a relevance feedback score of an image embedded in the resource. An example relevance feedback score is a score derived from a click-through rate of an image when that image is referenced in a search result. These combined scores are then used to present search results directed to the images embedded in the resources.

The user devices 106 receive the search results, e.g., in the form of one or more web pages, and render the pages for presentation to users. In response to the user selecting a link in a search result at a user device 106, the user device 106 requests the resource identified by the link. The web site 104 hosting the resource receives the request for the resource from the user device 106 and provides the resource to the requesting user device 106.

Search queries 109 submitted during user sessions are stored in a data store such as the historical data store 114. Selection data specifying actions taken in response to search results provided are also stored in a data store such as the historical data store 114. These actions can include whether a search result was selected. The data stored in the historical data store can be used to map search queries 109 submitted during search sessions to resources that were identified in search results 111 and the actions taken by users.

In some implementations, the search system 110 includes an image search subsystem 120 that is used to process query images to identify images that are both visually and semantically related to the query image. For example, an initial set of images identified by a text query may be referenced on a user device 106 by search results 111. The user of the user device 106 can then select one or more of the search results 111, e.g., select an image thumbnail, and submit a request to the search system 110 to perform an image search using the image as a query image. The image search subsystem 120 then processes the query image to identify images that are visually and semantically related to the query image.

The term "visual relatedness" refers to the visual similarity of images as measured by visual features of the images. For example, high contrast images are visually related by their high contrast, and sepia tone images are visually related by their use of sepia tones. The term "semantic relatedness" refers the relatedness of the textual description of the images. For example, two images are semantically related if the two images are described as containing the same or related objects. In some implementations, the semantic relatedness of two images can be determined based on textual data that are associated with the images.

Figure 1B:
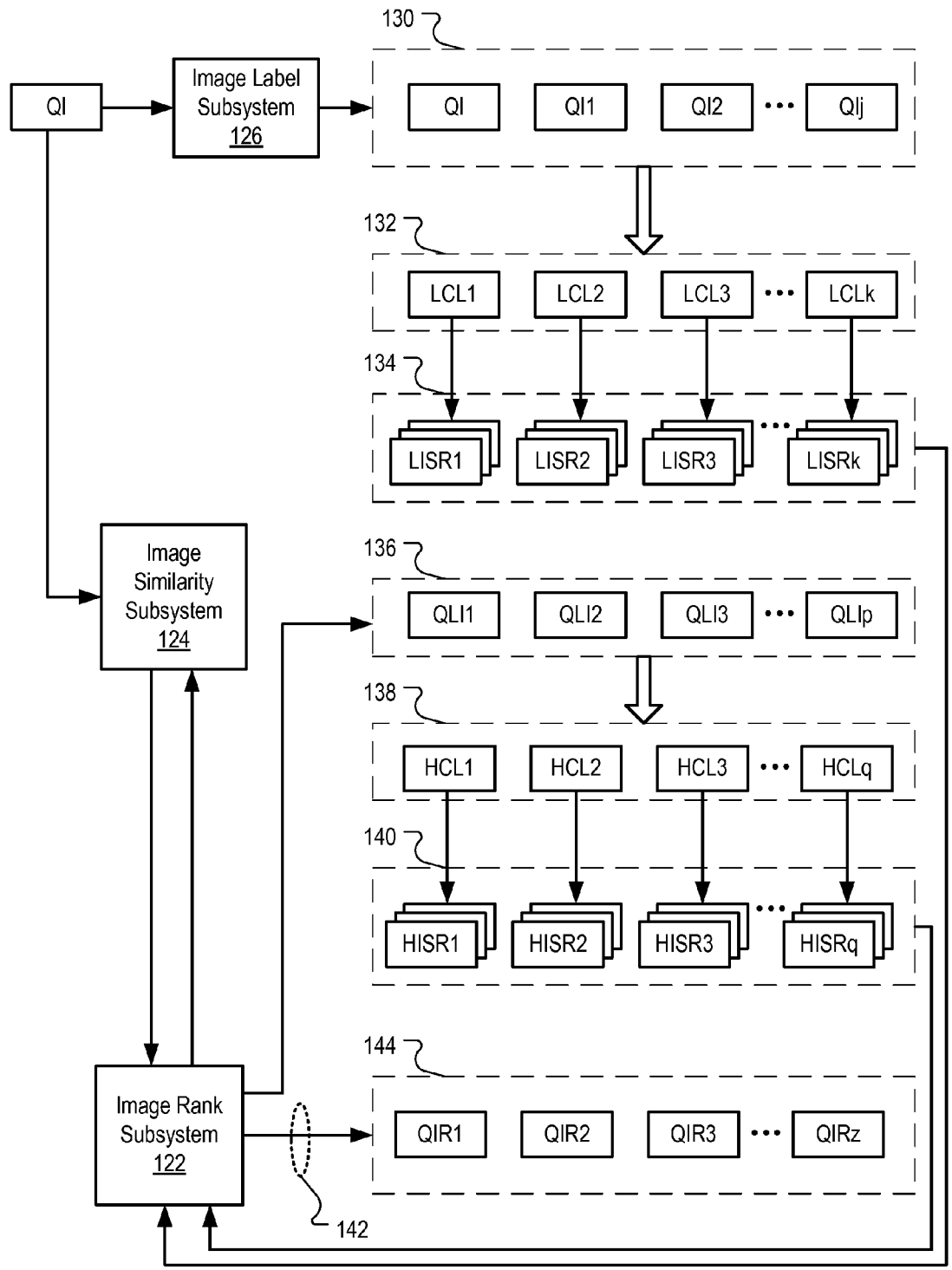
FIG. 1B is a block diagram of an example process flow in an image search subsystem.

FIG. 1B is a block diagram of an example process flow in the image search subsystem 120. The process illustrated by FIG. 1B can be done at query time, i.e., in response to receiving a request from a user device for image search results for a query image, or can be done prior to query time as part of a pre-processing operation.

Image Search Subsystem

The image search subsystem 120 includes an image relevance subsystem 122, an image similarity subsystem 124, and an image label subsystem 126. The image relevance subsystem 122 ranks images that are semantically related to a query image based, for example, on image similarity data. The image similarity subsystem 124 generates data representing the visual similarity of images to the query image. The image label subsystem 126 generates data indicative of the topic or subject matter to which images are related.

The query image QI is an image that is used as a query in an image search. The image search identifies search results that are relevant to the query image. The image search subsystem 120 can access the query image, for example, from a corpus of images stored in the indexed cache 112. The image search subsystem 120 can also receive query images that are uploaded to the image search subsystem 120, for example, by a user device 106.

The image search subsystem 120 process flow begins with the image label subsystem 126 receiving a query image as input. The image label subsystem 126 identifies other images indexed in the indexed cache 112 that are duplicates or near duplicates of the query image QI. For example, scaled versions of the query image QI and different colored versions of the query image QI can be identified. Additionally, other resources, e.g., web pages that refer to the query image QI, as well as the web pages that refer to the near duplicates of the query image QI, can also be identified. These identified resources define a set of resources 130 from which low confidence labels are obtained.

In some implementations, a subset 132 of the low confidence labels are used as text queries for image searches. Identification of the subset is described with reference to FIGS. 4-5. Each of the text queries can be provided to the search system 110 as image search queries, and in response the image search subsystem 120 can receive corresponding sets of image search results 134 responsive to the low confidence labels, i.e., LISR1 . . . LISRk. The image search results 134 include references to results images that were identified in response to the image search queries.

The sets of image search results 134 are provided to the image relevance subsystem 122. The image relevance subsystem 122 then calls the image similarity subsystem 124, which, in turn, compares each image referenced by one of the image search results 134 to the query image and scores the image to generate a visual similarity score for that image. The visual similarity scores are returned to the image relevance subsystem 122, which then ranks the scored images according to the visual similarity scores. In some implementations, the images referenced by the image search results 134 can also be scored using other data, e.g., relevance feedback for each image, the importance of each page on which the corresponding images are embedded, and other data.

A highest ranked subset of the images 136 is then selected, and the image label subsystem 126 then extracts high confidence labels HCL for each of the images and the highest ranked subset of images 136. The high confidence labels are then ranked based, for example, on a number and/or quality of web pages with which the high confidence label is associated, as described with reference to FIG. 4. A subset of the high confidence labels 138 are used as text queries for image searches. Each of these text queries can be provided to the search system 110, and in response the image search subsystem 120 can receive corresponding sets of image search results 140 responsive to the high confidence labels HISR1 . . . HISRq. Each of the image search results 140 references a candidate image that is a candidate for final association with the query image.

The sets of image search results 140 are provided to the image relevance subsystem 122. The image relevance subsystem 122 then calls the image similarity subsystem 124 to receive visual similarity scores that measure the visual similarity of each referenced image in the sets of image search results 140 to the query image QI. The scored images are then ranked according to the visual similarity scores and other data, e.g., relevance feedback for each image, the importance of each page on which they corresponding images embedded. Furthermore, the visual ranking of the images can be refined by visual ranking refinement process 142 to remove images and have visually dissimilar features from the highest ranked images. The visual ranking refinement process 142 can be defined by ranking refinement rules, which are described in more detail below.

A final set of query image results 144 is then produced by the image relevance subsystem 122 and associated with the query image QI. The final set of query image results 144 is then provided to the user device that submitted the query image QI as an input to an image search operation.

The process described above can also be done during a preprocessing stage to reduce latency. For example, all images indexed in the indexed cache that exceed a performance threshold, e.g., a minimum click through rate, can be selected for pre-processing. Each image can then be used as a query image QI, and can be associated with a corresponding final set of query image results 144. Thereafter, when a user selects a corresponding image as a query image, the corresponding final set of query image results 144 can be provided by looking up the pre-associated query image results.

Each of the subsystems and corresponding processes are described in more detail below.

Image Relevance Subsystem

In some implementations, the image relevance subsystem 122 includes one or more processors configured to rank candidate images based on relevance scores that are indicative of how well the candidate images match the query image. The relevance scores are generated based on one or more relevance measures of the candidate images relative to the query image. The relevance measures can be computed, for example, based on a measure of how visually similar a candidate image is to the query image and a semantic relatedness of the candidate image to the query image.

The visual similarity of two images can be represented by a visual similarity score. The visual similarity score for an image is a measure of the visual similarity of the image relative to a reference image. The reference image can be, for example, a query image for which image search results are being generated. The reference image can also be any other image relative to which image similarity scores of other images are desired. A visual similarity score can be generated, for example, by the image similarity subsystem 124, as described below.

The semantic relatedness of two images is an indication of the likelihood that the two images contain the same or related objects. In some implementations, the semantic relatedness of two images can be determined based on textual data that are associated with the images. For example, clustering systems and/or algorithms can provide measures of similarity for a term relative to other terms. These measures of similarity can be used to determine semantic relatedness of text that is associated, for example, with candidate images and a query image.

Labels can be derived from text that is associated with candidate images and the query image. A label is data that specifies subject matter to which an image is related. For example, an image of a baseball can have the labels "baseball" and/or "sports" associated with it.

Labels can be explicitly designated by a publisher of the web site 104 or generated, for example, based on text that appears near the image on the web page. For example, a label can be generated for an image based on text that is located adjacent to the image or in a portion of a document that is identified as containing information relevant to the image. A label can also be generated based on text that is included in the image or otherwise associated with the image, e.g., text included in a file name, text included in anchor text of a link to the image, or resource location of the image. The image label subsystem 126 can generate labels for images, as described below.

The image relevance subsystem 122 accesses visual similarity scores for each of the candidate images relative to the query image to identify a measure of visual similarity between the candidate images and the query image. Image similarity scores that have been previously generated can be accessed, for example, from the indexed cache 112.

If image similarity scores for the candidate images are not accessible, the image relevance subsystem 122 can provide data identifying the query image and the candidate images to the image similarity subsystem 124. In turn, the image similarity subsystem 124 accesses or extracts vectors of image feature scores for the query image and candidate images and generates image similarity scores for the candidate images relative to the query image, as described below.

Relevance scores are generated for the candidate images based on the visual similarity scores and, in turn, the candidate images can be referenced in image search results in an order according to the relevance scores. In some implementations, the relevance scores can be combined with other scores for the candidate images, e.g., authority scores that measure the relative importance of the image to other images or the rate at which search results for the candidate images are selected. The candidate images can then be referenced in image search results in an order according to the relevance scores in combination with these other scores. Relevance scores in the context of the candidate images can be computed based wholly or in part on the visual similarity scores, i.e., the term can be either the visual similarity score or a score that is a function of the visual similarity score and one or more other scores.

In some implementations, the image relevance subsystem 122 can also refine the rank of the candidate images based on ranking refinement rules in a ranking refinement process 142. Ranking refinement rules condition the selection of a candidate image based on satisfaction of the ranking refinement rules. For example, the ranking refinement rules can require that an image have a specified image characteristic to be ranked. Thus, the ranking refinement rules can affect the order by which images are referenced in image search results.

Ranking images relative to a query image is described in more detail with reference to FIGS. 6-9.

Image Similarity Subsystem

The image similarity subsystem 124 includes one or more processors configured to generate a visual similarity score for an image relative to the query image and/or other images. The visual similarity score for an image can be based, for example, on image feature scores of the image and the query image.

Image feature scores are values of image features representing visual characteristics of a portion or an aspect of an image. The portion of the image can include the entirety of the image. In some implementations, the image features can include color, texture, edges and other characteristics. Image feature scores can be computed, for example, for images during the crawling that is performed by the search system 110 or the image search system 120. The image feature scores can be computed at two or more image scales so that visual similarities between images at different visual scales can be more accurately determined. Example processes for extracting values of image features from which a feature score can computed include processes for generating color histograms, texture detection processes (e.g., based on spatial variation in pixel intensities), scale-invariant feature transform, edge detection, corner detection and geometric blur.

The description that follows refers to generating a visual similarity score for an image relative to a single query image. However, a visual similarity score can be generated for an image relative to a set of query images including two or more images. When visual similarity scores are generated relative to a set of query images, the image feature scores for the set of query images can be considered independently or as a query set of image feature scores.

For example, the query set of image feature scores can include image feature scores from any of the query images (e.g., a logical OR operation of image feature scores), image feature scores that occur in every query image (e.g., a logical AND operation of image feature scores) or any other subset of the image feature scores. Once the query set of image feature scores has been identified the query set of image feature scores can be processed in a manner similar to the image feature scores for a single query image.

In some implementations, the visual similarity score for an image can be based, for example, on a composite visual distance between the image and the query image. The composite visual distance can be based on a linear or non-linear combination of visual distances between the individual feature scores of the images relative to the feature scores of the query image.

For example, a Manhattan distance, Euclidean distance or any other feature distance for each image feature score can be determined relative to the image feature scores of the query image to generate a set of image feature score to query image distances. In turn, a visual distance vector for the image relative to the query image is generated based on the feature score to query image distances. Each feature distance in the visual distance vector for an image corresponds to a distance between an image feature score for the image and an image feature score for the query image that is of the same type and is most proximate to the image feature score for the image.

The image similarity subsystem 124 can apply an image similarity model to the visual distance vector to determine a measure of similarity of the image relative to the query image. For example, a result of the dot product of the visual distance vector for an image and the image similarity model can be defined as a visual similarity score for the image. Similarly a function of the result of the dot product can be defined as the visual similarity score for the image.

In some implementations, the image similarity model can be trained based on similarity feedback data ("similarity feedback") received from user devices 106. Similarity feedback is user feedback that identifies images that are more similar to the query image and images that are less similar to the query image. Similarity feedback can be used, for example, to train the image similarity model to identify subtle relationships between images that correspond to a user's perception of image similarity.

Generating image similarity scores for images is described in more detail with reference to FIGS. 2-3.

Image Label Subsystem

As described above, image labels can be used to identify images that are related to a query. However misdescriptive labels can result in unrelated images being improperly identified as related to a topic, subject matter, or another image. For example, if an image of a baseball and an image of an egg are each associated with a common label (e.g., "egg") then these images may both appear in search results responsive to a query image of an egg even though the label "egg" is unrelated to the image of the baseball.

Misdescriptive labels may be purposely associated with images by users, for example, to direct traffic to a particular resource, or inadvertently associated with the image when the label is generated based on text that appears with the image, but is unrelated to the image. Regardless of how an image is associated with a misdescriptive label, identifying images responsive to search results based on misdescriptive labels can negatively affect the quality of image search results.

Thus, in some implementations, the image label subsystem 126 includes one or more processors that are configured to identify or select high confidence labels for images. High confidence labels are image labels that are generated, selected, or otherwise identified for an image based on an analysis of labels that are associated with the image and other images that are visually similar to the image. High confidence labels generally provide a more reliable description of the content of an image because the label is also associated with other images that are visually similar to the image for which the label is generated.

In some implementations, the image label subsystem 126 can select high confidence labels for a query image based on initial labels (also referred to as "first labels" or "low confidence labels") that are associated with the query image. The initial labels can be identified based on labels that are explicitly associated with the query image or text that is associated with the query image, as described above.

The image label subsystem 126 provides the initial labels to the search system 110 and receives image search results that are responsive to each initial label that is associated with the query image. The images referenced by these image search results are ranked, for example, by the image relevance subsystem 122 according the image similarity scores of the images relative to the query image.

The image label subsystem 126 identifies labels that are associated with a highest ranked subset of the ranked images as candidate high confidence labels for the query image. The image label subsystem 126 ranks the candidate high confidence labels based on various characteristics associated with the candidate high confidence label and the query image. For example, the candidate high confidence labels can be ranked based on the visual similarity score of the image with which the candidate high confidence label is associated and measures of relevance of the candidate high confidence label to the image, which is described in more detail below.

In some implementations, the image label subsystem 126 selects a subset of the ranked candidate high confidence labels as high confidence labels for the query image. The high confidence labels can be used, for example, as text queries for an image search to identify images having labels that are semantically related to the high confidence labels of the query image. Additionally, the image label subsystem 126 can iteratively identify high confidence labels using the generated high confidence labels as initial labels for the query image.

Identifying labels for images is described in more detail with reference to FIGS. 4 and 5.

The description that follows describes the image similarity subsystem 124, image label subsystem 126, and the image relevance subsystem 122 as well as processes that can be implemented by these and other subsystems in more detail. These subsystems and related processes are described with reference to a query image and image search results. However, each respective subsystem and process can be implemented with different processing systems and for different operational environments.

Generating Visual Similarity Scores

Figure 2:
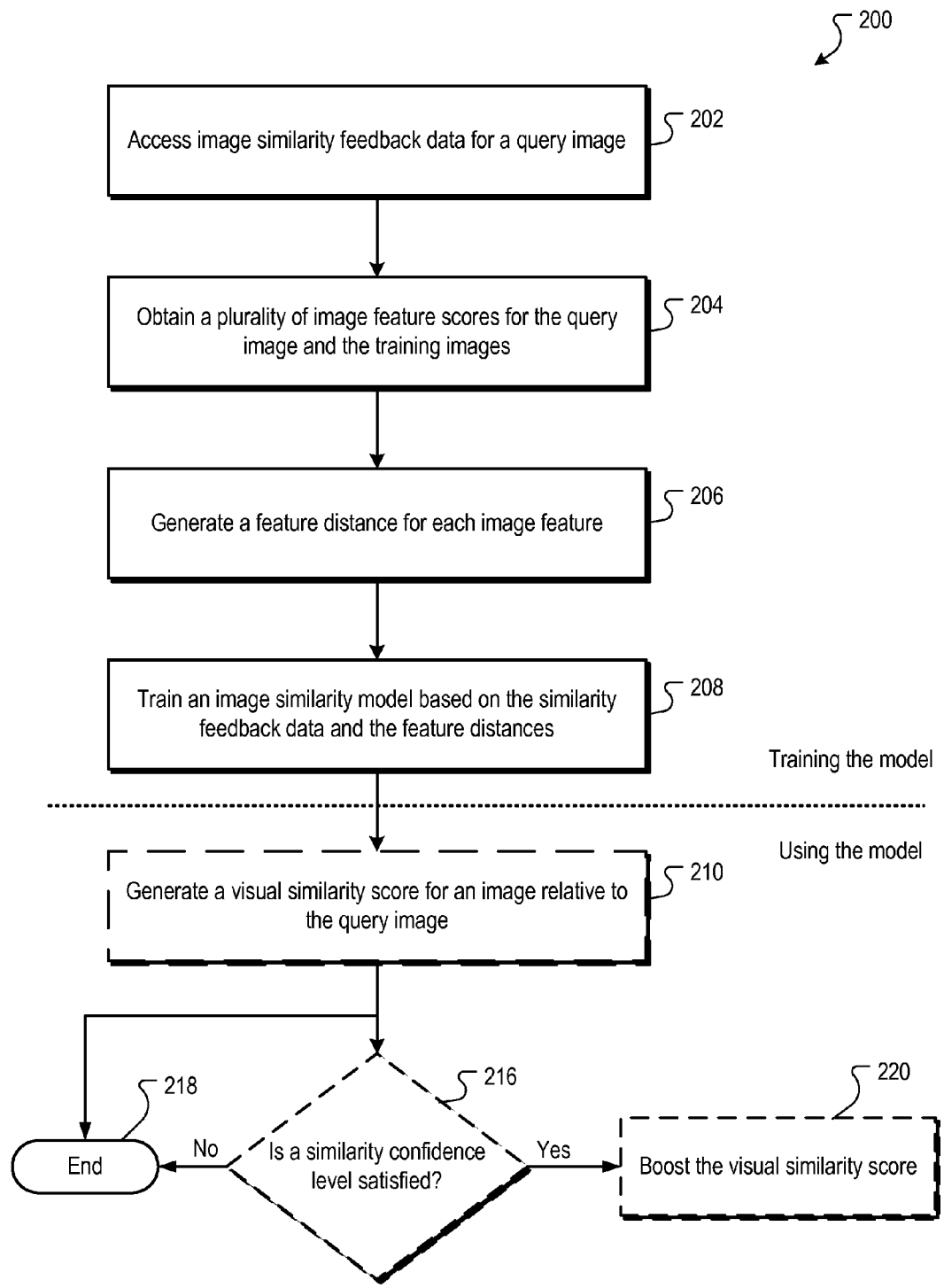
FIG. 2 is a flow chart of an example process for training an image similarity model.

FIG. 2 is a flow chart of an example process 200 for training an image similarity model. The process 200 can be implemented, for example, by the image similarity subsystem 124.

Image similarity feedback data for a query image is received (202). As described above, image similarity feedback data includes user feedback that identifies images that are more similar to the query image and images that are less similar to the query image. The image similarity feedback data can be received or otherwise accessed from a data store storing the feedback data.

The images that are respectively identified as "more similar" and "less similar" can be training images that are presented to a user device with the query image. For example, triplets of images can be provided to a user device. While triplets of images are described for purposes of example, similarity feedback data can be generated for other multiples of images.

Figure 3:
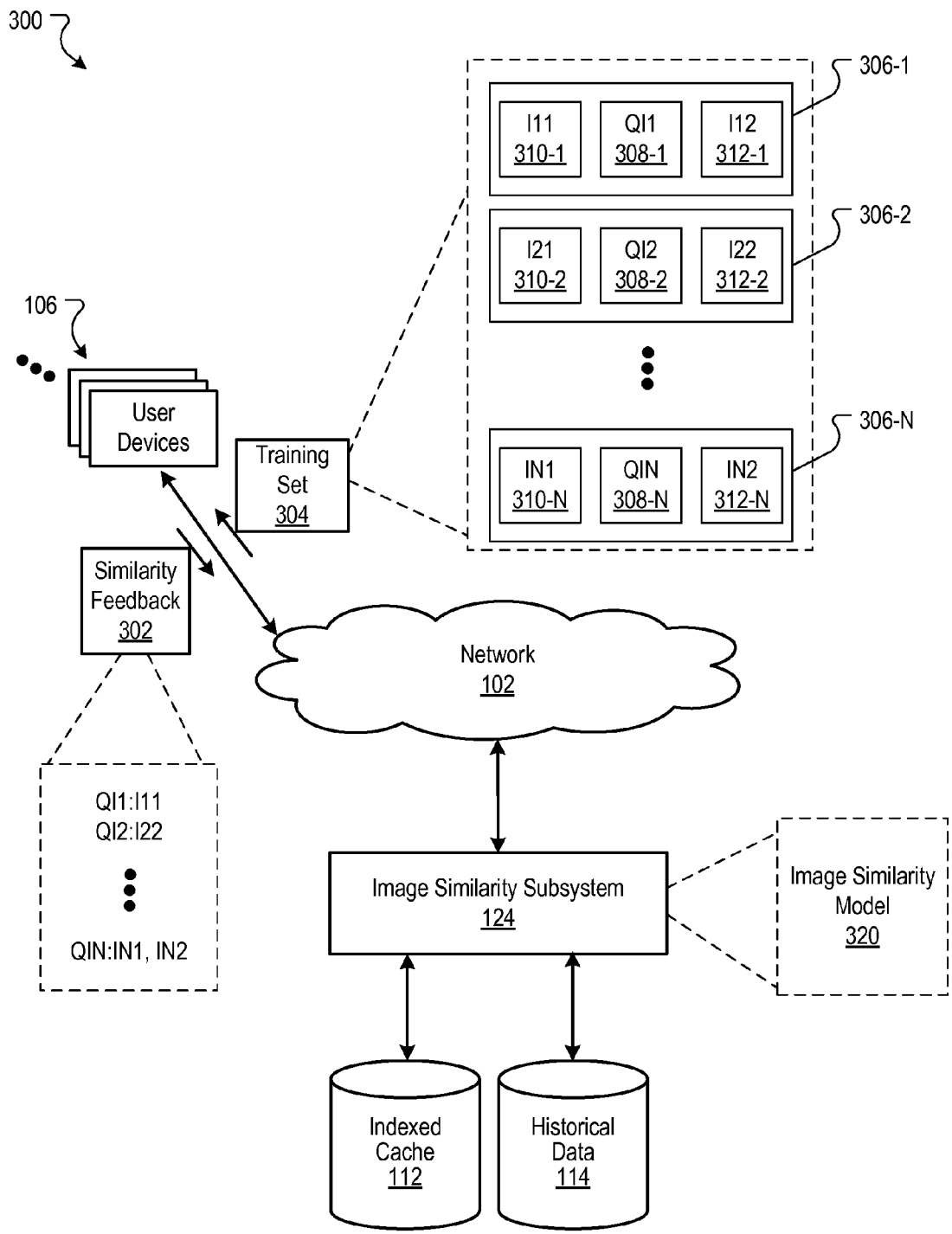
FIG. 3 is a block diagram of an environment in which similarity feedback for image triplets is generated.

FIG. 3 is a block diagram of an environment 300 in which similarity feedback for image triplets is generated. In some implementations, the similarity feedback 302 can be based on training sets 304 that include triplets of images 306. Each triplet of images 306-1-306-N includes the query image 308, and two training images 310 and 312.

The training images 310 and 312 can be selected based on image search results responsive to text that is related to the query image. For example, if the query image is associated with a label, the training images can be selected based on image search results for the text "baseball." Images referenced by a top N image search results can be randomly selected as training images. Thus, each triplet 306 can include training images 310 and 312 that are randomly selected from image search results related to the query image.

In some implementations, the random selection of each training image 310 and 312 can be subject to selection rules. For example, the training image 310 can be randomly selected from the top 10 image search results for the query term, while the training image 312 can be randomly selected form the image search results 11-50.

In some implementations, the training images (e.g., 310 and 312) in the training set 304 can be classified relative to the query image 308 by users through user devices 106. For example, the image similarity subsystem 124 can provide triplets of images 306-1-306-N to a user device 106 for presentation to a user with a request that the user select or otherwise identify the image 310 or 312 in each triplet 306-1-306-N that is visually more similar (or less similar) to the query image 308. Optionally, the user can be provided a choice that both training images 310 and 312 are equally similar to the query image 308.

The user's response to the request is referred to as similarity feedback 302 and includes data specifying the triplet of images 306 of the training set 304 that was presented to the user and the user's classification of the images. For example, the similarity feedback 302 can indicate that the user was provided the triplet of images 306-1 and that the user indicated that image 310-1 is more similar to the query image than image 312-1. Similar similarity feedback 302 can similarly be received for triplets 306-2-306-N. Additionally, the similarity feedback 302 for triplets 306-2-306-N can be received from the users through user devices 106.

The similarity feedback 302 that is received from the user devices 106 can be used to train the image similarity model 320 as described below, and/or stored in a data store, e.g., the indexed cache 112 for later use by the image similarity subsystem 124.

With reference again to FIG. 2, image feature scores are obtained for the query image and the training images (204). As described above, each image feature score specifies the visual characteristic of an image. Example image features for which scores can be identified or computed include color, texture, edges and other characteristics of a portion of the image.

In some implementations, image feature scores can be obtained, for example, from the indexed cache 112. For example, the image similarity subsystem 124 can access the indexed cache 112 and identify image feature scores that are stored at memory locations associated with each image in a training set 304. If image feature scores are not accessible from the indexed cache 112 or another data store, the image similarity subsystem 124 can compute the image feature scores for each of the images in the training set 304, or provide the images to another processing system to compute the feature scores. As described above, the image feature scores can be computed using processes to identify a color histogram for the image, texture features as well as processes e.g., scale invariant feature transformation and/or geometric blur.

A feature distance is generated for each image feature score (206). In some implementations, the feature distance is the visual distance between image feature scores for a training image and image feature scores for the query image. As described above, the visual distance for each image feature score of the training image can be relative to the image feature score set of the query image. The feature distance can be generated, for example, by the image similarity subsystem 124.

An image similarity model is trained based on the similarity feedback data and the feature distances (208). In some implementations, the image similarity model is trained to generate a visual similarity score for an image based on image feature scores of the image. The image similarity model can be implemented, for example, as a vector of weights with each weight corresponding to an image feature (i.e., a vector of feature weights) and representing a relative importance of the image feature (i.e., a feature weight) for identifying visual similarities between images. Therefore, the image similarity model can be trained by iteratively adjusting each weight in the vector of weights based on image feature scores of images that are identified as more similar to a query image and image feature scores of images that are identified as less similar to the query image.

Referring again to FIG. 3, the image similarity subsystem 124 can use the similarity feedback 302 and the corresponding image feature scores for the images in the training set 304 to train the similarity model 320. For example, the image similarity subsystem can iteratively adjust the vector of weights of the image similarity model 320 based on the similarity feedback 314 and image feature scores corresponding to image triplets 306 in the training set. Based on this data, the image similarity model 320 learns feature scores and combinations of feature scores that are indicative of an image that is similar to the query image 308 and adjusts the vector of weights accordingly so that images having the identified feature scores are recognized as more similar to the query image.

The image similarity model 202 can be periodically updated or retrained to adjust the vector of weights. For example, the image similarity model 320 can be trained based on similarity feedback 302 for training sets 304 that include images that have been recently made available by publishers.

Using similarity feedback 302 for closely related images to train the image similarity model 320 results in a model that identifies image similarities in a manner more consistent with the manner in which users identify similar images because the data with which the model is trained is classified by users.

In other implementations, the images 310 and 312 that are included in a triplet 306 can be images that are visually similar based on baseline similarity scores relative to the query image 308. The image similarity subsystem 124 can receive, access or generate baseline similarity scores for each of the candidate training images.

The baseline similarity scores for the candidate training images can be generated based on image feature scores identified by a scale invariant transform function, a geometric blur and/or other image feature detection systems and/or methods. For example, visual distance vectors as described above can be generated for the candidate training images and used to generate baseline similarity scores. If similarity feedback is available for the candidate training images, it can also be used.

Using the baseline similarity scores, the image similarity subsystem 124 can select, as training images, the candidate training images having visual similarity scores that satisfy (i.e., meet or exceed) a training image threshold. For example, the training image threshold can require that the visual similarity scores for each training image have a value that is one of a top N visual similarity scores among the candidate training images. Similarly, the training image threshold can require that the visual similarity scores for each training image be within a top N percent of all visual image scores or a minimum absolute score threshold.

Selecting images 310 and 312 having baseline similarity scores that satisfy (i.e., meet or exceed) the training image threshold can result in similarity feedback 302 that classifies images that might otherwise been unclassified. For example, the similarity feedback 302 may provide data identifying either image 310 or 312 as more similar to the query image 308, when images 310 and 312 might otherwise have been identified as either both similar to or both dissimilar to the query image.

Once trained, the image similarity model 320 can be used to generate visual similarity scores that measure a visual similarity of a query image to other images (210). The visual similarity score provides a measure of visual similarity of the image to the query image. The image similarity model includes a vector of image feature weights that can be applied to corresponding image feature scores of the image to generate a visual similarity score for the image. For example, the visual similarity score for the image can be a dot product of the vector of feature weights and the vector of image feature scores for the image.

In some implementations, a visual similarity score relative to the query image can be generated for each of the images included in a corpus of images. For example, multiple images may be identified as related to subject matter to which the query image is related. Therefore, it may be useful to score these images based on their visual similarity to the query image.

In some implementations, a determination can optionally be made as to whether a similarity confidence level for the image relative to the query image is satisfied (216). The similarity confidence level can be represented, for example, by satisfaction of a condition indicating that the image and the query image are visually similar.

The condition can be satisfied when a common distinct set of image feature values is identified for the image and the query image. A common distinct set of feature values is a set of image feature values that are indicative of a common distinct object being included in two images. These common distinct feature sets do not occur in many images, and, therefore, may not be accurately identified by the image similarity model. However, due to the relatively low number of images that include the common distinct feature sets, images that do include the common distinct feature set are more likely visually similar. Thus, identification of a common distinct set of image features values for two images is indicative of an increased likelihood that the two images are more visually similar than indicated by the visual similarity score generated by the image similarity model.

A common distinct set of image feature values can be identified based on a minimum number of matching image feature values for each of the images. For example, two images may be identified as having a common distinct set of image feature values when the two images have three SIFT features having common values. For example, if each of the three pairs of SIFT features for the images each have magnitude and location components that are respectively within specified ranges, the images can be identified as having a common set of image feature values. In turn, the images can be identified to be more visually similar.

If the common distinct set of image feature values is not identified in the image, the similarity confidence level is not satisfied and the process 200 can end (218). If the common distinct set of image feature values is identified in the image, the similarity confidence level is satisfied and the visual similarity score for the image relative to the query image can be boosted or scaled by a boost factor (220). The boost factor can be, for example, a function of the visual similarity score. For example, to obtain a boost factor, the visual similarity score can be multiplied by a value, raised to a power, or otherwise adjusted by any other function that causes an increased visual similarity measure.

In some implementations, the visual similarity score for an image can be boosted by a common boost factor. A common boost factor can be used to boost the visual similarity score for any image that is identified as having a distinct set of image feature values in common with the query image irrespective of how well the set of visual similarity scores matched. For example, a duplicate of the query image, for which the feature values are exactly the same as the query image and a non-duplicate image each having the distinct set of image feature values can each be boosted by the same boost factor.

In some implementations, the boost factor can be a function of the closeness of the match between the distinct set of image feature values. For example, a duplicate of the query image can have a higher boost factor applied to its visual similarity score than an image that has image feature values that are not exactly the same as the query image.

Selecting High Confidence Labels

Figure 4:
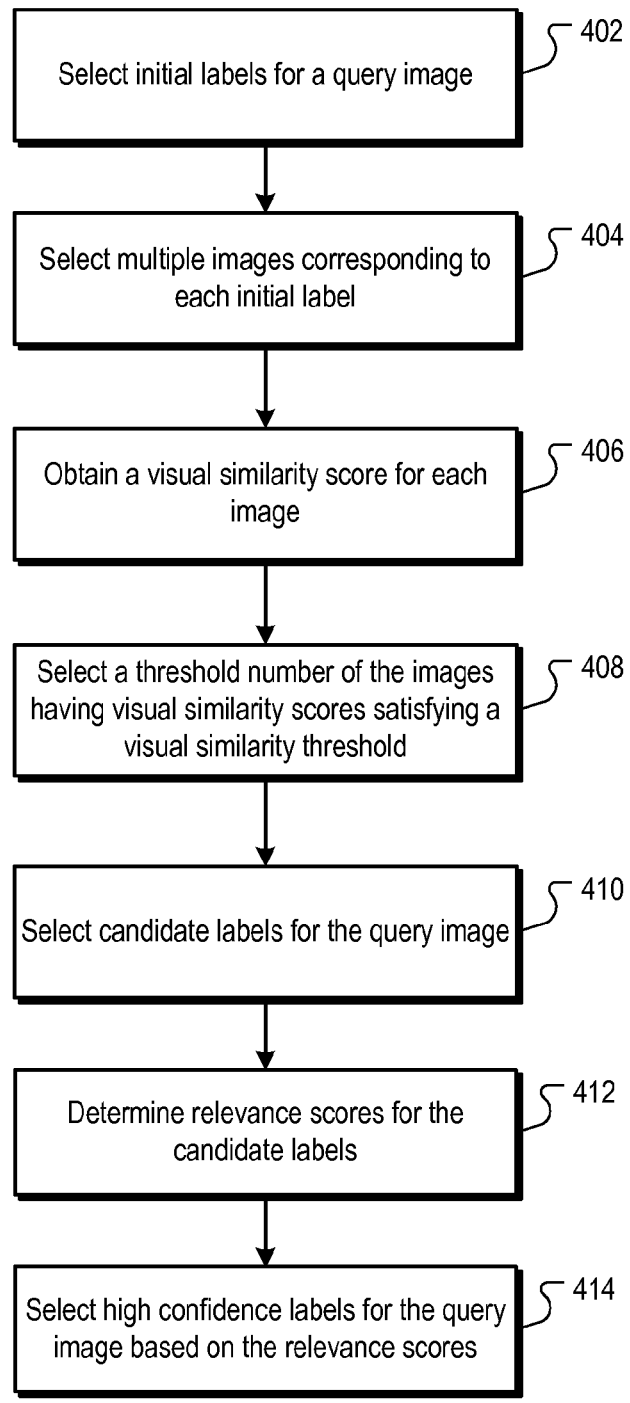
FIG. 4 is a flow chart of an example process for selecting labels for an image.

FIG. 4 is a flow chart of an example process 400 for selecting labels for an image. The process 400 can be implemented, for example, to generate labels for a query image or any other image. For clarity, the description that follows describes generating labels for a query image. The process 400 can be implemented, for example, by the image label subsystem 126.

Initial labels are selected for a query image (402). With reference to FIG. 1B, the initial labels are referred to as "low confidence labels." In some implementations, each initial label is descriptive of one or more objects in the query image. The initial labels that have previously been associated with the query image can be accessed, for example, from the indexed cache 112. Additional initial labels can be identified and/or selected based on a resource in which the query image is presented and/or resources that include a reference to the query image.

For example, the initial label can include one or more labels that are associated with the query image either explicitly, or generated based on text associated with the query image. The initial labels can also include labels that are identified based on resources that include references to the query image, or from resources that include the same or near duplicate of the query image.

Figure 5:
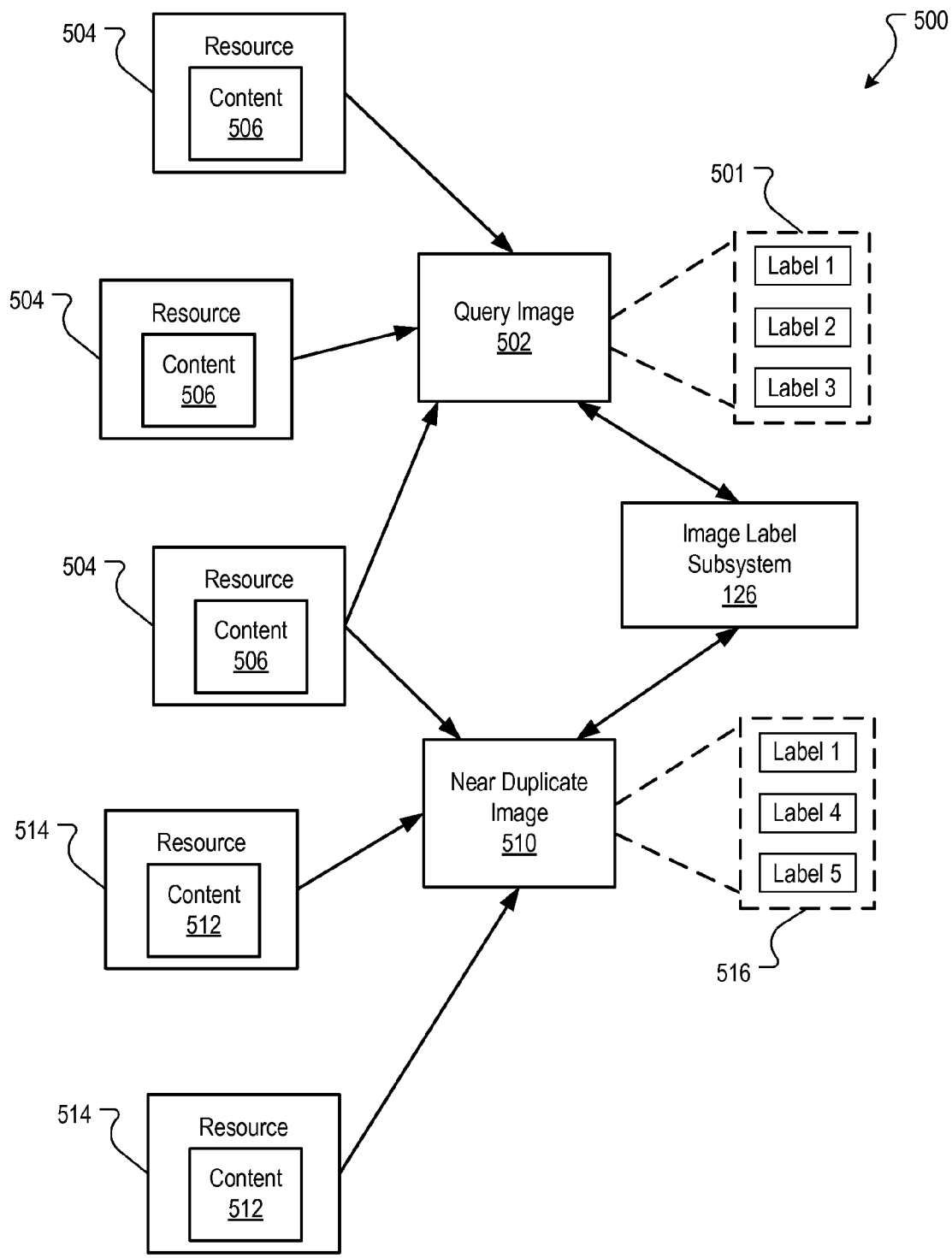
FIG. 5 is a block diagram of an environment in which initial labels are identified for a query image.

FIG. 5 is a block diagram of an environment 500 in which initial labels 501 are identified for a query image 502. The image label subsystem 126 receives or otherwise accesses the query image 502. The image label subsystem 126 analyzes the query image 502 to identify labels that are explicitly associated with the query image 502, or can be generated based on text or other content associated with the query image 502.

For example, the image label subsystem 126 can analyze metadata associated with the query image 502 or a webpage with which the query image is presented to identify labels that have been explicitly associated with the query image or the webpage by a publisher. Labels that have been explicitly associated with the query image can be identified as initial labels 501.

If the query image 502 is located on a webpage with adjacent text, the image label subsystem 126 can also analyze the text to identify initial labels 501 that correspond to the text. Additionally, the image label subsystem 126 can access resources 504 that include a reference to the query image to identify content 506 that may inform selection, generation or identification of initial labels 501 for the query image 502.

For example, the image label subsystem 126 can analyze the content 506 to identify text that is associated with the reference to the query image 502. Text that is associated with the reference to the query image can include, for example, anchor text for a hypertext link to the query image 502, or text adjacent to a hypertext link to the query image. Based on the analysis of the text that associated with reference to the query image 502, the image label subsystem 126 can identify additional initial labels 501 to associate with the query image 502.

In some implementations, the image label subsystem 126 can also identify initial labels 501 for the query image 502 based on labels that are associated with a near duplicate image 510 of the query image. A near duplicate image is an image having a visual similarity score relative to the query image that satisfies (i.e., meets or exceeds) a near duplicate threshold. The near duplicate threshold can require that an image have at least a minimum absolute visual similarity score, a visual similarity score that is within a specified percentage of a specified score or be a score that is included in top N available scores.

The image label subsystem 126 can analyze the near duplicate image 510 in a manner similar to that described above with reference to the query image 502. For example, the image label subsystem 126 can analyze labels that have been explicitly associated with the near duplicate image by its publisher, text associated with a near duplicate image 510 as well as content 512 and 506 of resources 514 and 504 that include references to the near duplicate image 510.

Additional initial labels 516 that are identified based on analysis of the near duplicate images 510 and resources 514 can include labels that were also identified based on the analysis of the query image 502. For example, "Label 1" is identified as an initial label 501 for both images 502 and 510. However, the additional initial labels 516 may also include labels that were not originally identified as an initial label 501 based on the analysis of the query image 502. For example, "Label 4" and "Label 5" were identified as additional initial labels 516, but not initial labels 501. Thus, analysis of near duplicate images 510 can provide additional labels that may be indicative of the subject matter to which the query image 502 is related.

In some implementations, the initial labels 501 and additional initial labels 516 can also be identified based on relevance feedback data that is generated from image search results responsive to a user query, i.e., data that provides a measure of relevance of a resource to a query based on user selections of the resource in response to the query. Relevance feedback data can be used to identify initial labels, for example, by identifying user queries for which the query image was selected.

For example, image search results may be provided by the search system in response to the user query "baseball." If a reference to the query image is selected a threshold number of times when presented in the search results for the query "baseball," it is likely that the term "baseball" is related to the query image. Therefore, the term "baseball" can be identified as an initial label for the query image.

Identification of a label as an initial label can be conditioned based on a confidence measure that satisfies (i.e., meets or exceeds) a confidence threshold. The confidence measure is an indication of a likelihood that the label accurately describes the subject matter of the query image. The confidence measure can be based on authority measures or quality measures for resources that include references to the query image. For example, if a resource that references the query image has a high authority measure or quality measure, identifying the resource as an authoritative resource or high quality resource, then it is more probable that the text associated with the reference to the query image accurately describes the subject matter of the query image.

In some implementations, the confidence measure for a label can also be based on a number of the near duplicate images that are associated with the label or a near duplicate label (e.g., plural of the label). For example, the confidence measure for a label that is associated with twenty near duplicate images will be higher than the confidence measure for a label that is associated with two of the near duplicate images.

The confidence measure for a label can also be based on a number of distinct image clusters in the near duplicate images with which the label is associated. Image clusters are clusters of M images that are most visually similar based on their visual similarity scores. The confidence measure for a label can be increased for each image cluster with which the image cluster is associated. For example, two labels may each be associated with three different images, respectively. The images with which the initial label is associated with may all be members of the same cluster group, while each of the images with which the second label is associated may each be members of separate cluster groups. In this example, the confidence score of the second image can be increased relative to the confidence score of the initial image based on the second image being associated with a higher number of image clusters.

The confidence threshold can be, for example, a minimum confidence measure that a label must have to be identified as an initial label. The minimum confidence measure can be specified as an absolute confidence measure, a top N percent of confidence measures among a group of labels or a confidence measure that places the label within a top N number of labels based on confidence measures.

With reference again to FIG. 4, multiple images corresponding to each initial label are selected (404). In some implementations, each of the initial labels can be provided to a search system as text queries for an image search. Image search results responsive to the initial labels are received from the image search system. The images that are referenced by the image search results are the images that correspond to the initial labels.

In some implementations, the images for each initial label can be received from a search system 110. For example, each initial label can be provided to the search system 110 as a text query for images related to the initial label. The search system can identify images corresponding to the initial labels and provide the image search results in response. In turn, the images can be identified based on the search results provided by the search system.

A visual similarity score is obtained for each of the images (406). The visual similarity score for each of the images is a score relative to the query image. In some implementations, the visual similarity score for an image can be obtained from a memory location and a data store corresponding to the image. If a visual similarity score is not accessible for the image, a visual similarity score can be generated. For example, data identifying the image for which a score is requested and the query image can be provided to a system that can generate a visual similarity score for the images, such as the image similarity subsystem 124.

A threshold number of the images having visual similarity scores satisfying (i.e., meeting or exceeding) a visual similarity threshold are selected (408). The visual similarity scores are relative to the query image. The visual similarity threshold specifies a minimum visual similarity score an image must have to be included in the threshold number of images. For example, the visual similarity threshold can specify that an image have at least a minimum absolute visual similarity score, a visual similarity score that is within a specified percentage of a specified score or be a score that is included in top N available scores.

The threshold number is a maximum number of images that are identified from the images. The threshold number can be used to limit the number of images that are identified from the images, for example, when a large number of the images have visual similarity scores that satisfy (i.e., meet or exceed) the visual similarity threshold.

Candidate labels are obtained for the query image (410). In some implementations the candidate labels are obtained from the labels corresponding to each of the threshold number of images. For example, an image in the threshold number of images may be associated with a label that corresponds to the initial labels as well as labels that do not correspond to the initial labels. Each label that is associated with the image can be identified as a candidate label for the query image. Thus, the candidate labels for the query image will include the initial labels as well as additional labels that are associated with each of the threshold number of images.

Relevance scores are determined for the candidate labels (412). The relevance scores are measures of relevance of the candidate label to the query image. In some implementations, the relevance scores are generated based on authority metrics and feedback metrics.

For example, the relevance score for a candidate label can be based on a function of a number of web pages that use the candidate label to reference the candidate image and/or near duplicates of the candidate image. Similarly, the relevance score can be based on a measure of authority associated with the web pages that use the candidate label to reference the candidate image and/or near duplicates of the candidate image. Additionally, the relevance score can be based on a function of relevance feedback data associated with the candidate image and the label.

In some implementations, the relevance score for a candidate label can also be based on the visual similarity score of the image from which the candidate label was identified. For example, a relevance score based on any or all of the above relevance measures can be scaled (e.g., weighted) based on the visual similarity score of the image relative to the query image.

High confidence labels are selected for the query image based on the relevance scores (414). In some implementations, a threshold number of candidate labels having relevance scores that satisfy (i.e., meet or exceed) a threshold relevance score are selected as high confidence labels for the query image. The threshold relevance score can specify a minimum absolute relevance score, a relevance score that is within a specified percentage of a specified relevance score or be a relevance score that is within a top N identified relevance scores.

The high confidence labels can be associated with the query image to facilitate identification of images that are semantically related to the query image. For example, the high confidence labels can be provided to a search system as part of a request for image search results for the query image.

The high confidence labels can be used in other applications. For example, the high confidence labels can be used to identify advertisements that are related to the query image for presentation with the query image. Further, high confidence labels can be used to facilitate query expansion techniques. For example, because all of the high confidence labels are likely related to a common image, it is also likely that each of the high confidence labels can be used as alternative or additional query terms to identify related topics and/or subject matter.

High confidence labels can be provided to a search system as text queries for an image search. Images that are relevant to the high confidence labels can be identified by the search system and referenced in image search results in response to the high confidence labels.

Ranking Images

The images that are identified based on the high confidence labels can be ranked based on the visual similarity scores of the images relative to the query image. In turn, a set of candidate images having the highest visual similarity scores relative to the query image can be selected for association as search results for the query image. However, in some situations, the set of candidate images can include images that are visually dissimilar to the query image in comparison to other images in the set. This dissimilarity reduces the homogeneity and/or overall quality of search results responsive to the query image. Thus, the homogeneity and/or quality of image search results can be increased by selecting candidate images to be in a final set of images based on their similarity to the query image as well as their similarity to other images in the final set.

Several visual ranking refinement processes can also be used to select the final set of images. These ranking refinement processes rank each image based on its similarity to the query image as well as its similarity to other images that are ranked higher than the image. These ranking refinement processes facilitate ranking the images such that the images that are more similar to the query image and other images that have already been ranked are ranked highest among the unranked images.

One ranking refinement process can require that each image in the final set of images include a dominant characteristic to increase the homogeneity of the ranked images, and in turn, image search results. For example, if the query image and many of the identified images are black-and-white images and a small number of the identified images are color images, including references to color images in image search results may reduce the quality of the image search results. Therefore, in some implementations, the final set of images can be selected based on the image having a "dominant characteristic" that is identified as being present in the query image and/or a large number of the images that are identified from the high confidence labels. This process is described in more detail with reference to FIG. 6.

Additionally, if an image has a high visual similarity score relative to the query image, but a low visual similarity score relative to other images that have been included in the final set, it is more likely that including a reference to the image will reduce the quality of image search results. Therefore, in some implementations, images can be selected to be included in the final set only when the image has at least a minimum visual similarity score relative to the query image, as well as a minimum visual similarity score relative to other images that have been included in the final set. Selecting candidate images based on visual similarity scores relative to the query image and other images that have been included in the final set is described with reference to FIGS. 7 and 8A.

Further, if an image has a high visual similarity score relative to the query image, but many nearest neighbor images for the image (e.g., images to which the image is visually similar) are not nearest neighbors of the query image and other images that have been ranked, it is more likely that including a reference to the image in image search results will reduce the quality of the image search results. Nearest neighbors are a specified number of other images that have visual similarity scores that are closest to that of the image. Thus, another refinement process requires that images are selected for the final set of images based on the images having a minimum number of nearest neighbor images in common with the query image and other images in the final set. This process is described with reference to FIGS. 7 and 8B.

Figure 6:
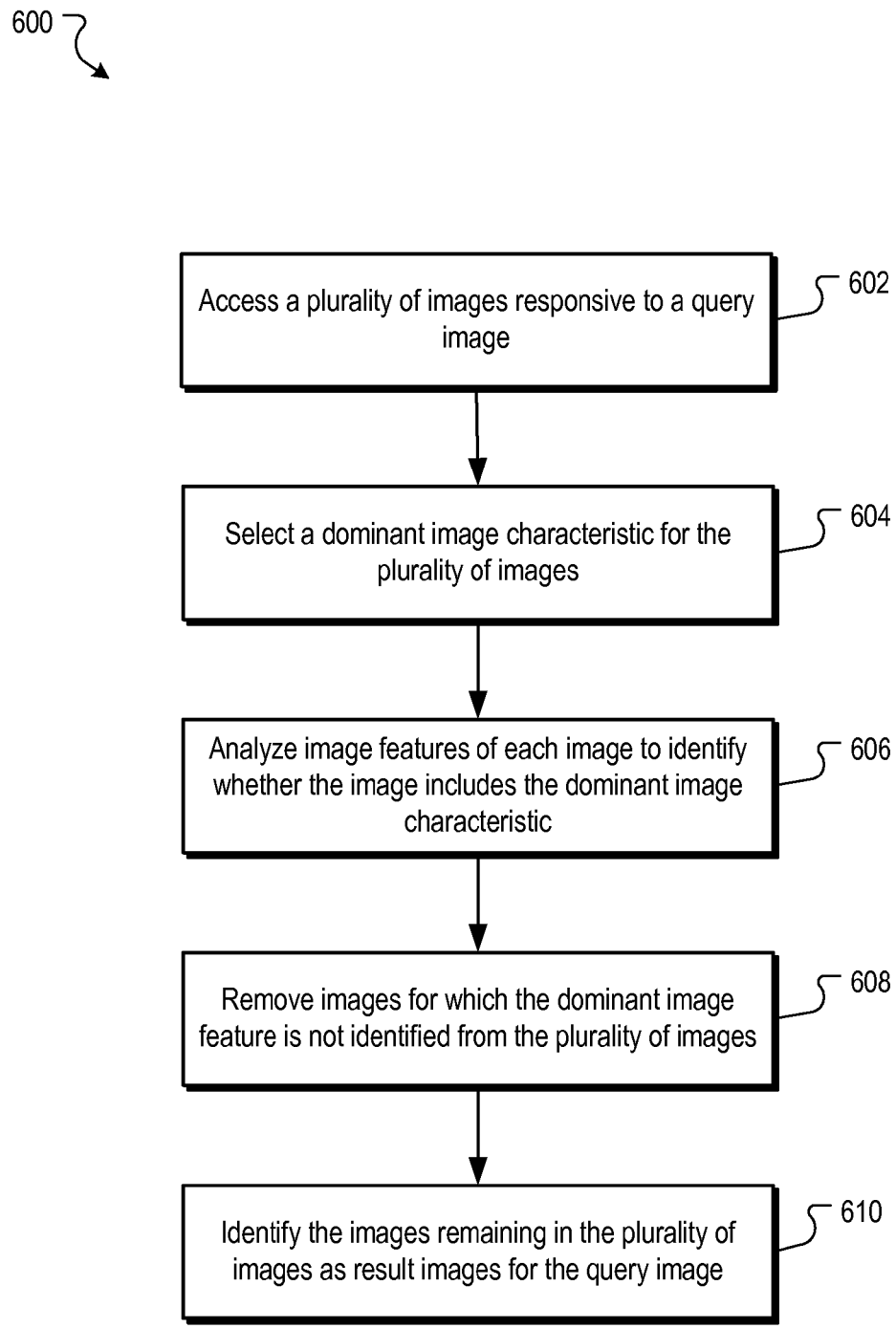
FIG. 6 is a flowchart of an example process for ranking candidate images.

FIG. 6 is a flowchart of an example process 600 for ranking candidate images. The process 600 can be implemented, for example, by the image relevance subsystem 122. In some implementations, the image relevance subsystem 122 ranks the candidate images based on the visual similarity scores of the candidate images relative to the query image. A number of rank positions for candidate images can correspond, for example, to a number of image search results (e.g., 500 or 100) that are identified for a query image. The candidate images can be ranked in the positions based on their visual similarity scores relative to the query image. For example, candidate images can be ranked in the positions in descending order of visual similarity score.

Candidate images that are referenced by image search results responsive to a query image are accessed (602). The candidate images can be images that are referenced by image search results provided by an image search system in response to the query image. For example, high confidence labels for the query image can be provided to the search system as text queries for an image search. The search system can return image search results that reference images that are relevant to the high confidence labels. The images referenced by the image search results are candidate images for the query image.

In some implementations, each candidate image has a visual similarity score that satisfies (i.e., meets or exceeds) an initial similarity threshold. The initial similarity threshold specifies a minimum visual similarity score relative to the query image that each candidate image must have. For example, the initial similarity threshold can specify that each candidate image have at least a minimum absolute visual similarity score, a visual similarity score that is within a specified percentage of a specified score, or be a score that is included in a top N number of identified scores.

A dominant image characteristic is selected for the candidate images (604). A dominant image characteristic is an image characteristic that is included in a threshold number of the candidate images (e.g., a majority of the candidate images). A coloration characteristic is an example of an image characteristic that can be identified as a dominant image characteristic. A coloration characteristic is an image characteristic that is indicative of the colors used in the image (e.g., red-green-blue color scale or grey-scale). For example, if a threshold number of the candidate images are black-and-white images, then a coloration characteristic "black-and-white" can be a dominant image characteristic for the images. Similarly, if a threshold number of the images include a human face, then a content characteristic "face" can be a dominant image characteristic for the images.

The image feature scores of each image are analyzed to identify whether the image includes a dominant image characteristic (606). Existence of a dominant image characteristic in an image can be identified based on image feature scores associated with the images. For example, if the dominant characteristic is a coloration of "black-and-white," the image feature scores of the images can be analyzed to determine whether the image feature scores indicate that the image is a color image or a black-and-white image. Similarly, if the dominant characteristic is the inclusion of a particular object, the image feature scores for each image can be analyzed to determine whether an image feature score pattern associated with the particular object is present in the image feature scores of the image.

Images for which the dominant image characteristic is not identified are removed from the set of images (608). For example, if all but one of the images is a black-and-white image and the remaining image is a color image, the color image can be removed from the images.

In some implementations, an image that is removed from the images can be replaced with another image having the dominant image characteristic. Continuing with the example above, a black-and-white image can be selected to be included with the images. The black-and-white image may be, for example, an image that would have occupied the lowest rank position among the images if the color image were not originally selected for inclusion in the images. Thus, the ranking of the black-and-white images that were originally included in images can remain in the same relative rank.

The images remaining in the images are identified as result images for the query image (610). The result images are images that are selected for reference in image search results responsive to the query image. Result data identifying the result images can be used to identify search results responsive to the query image. The result data can also include a relative ranking of the result images. Therefore, the result data can also be used to rank the result images relative to each other.

For example, the result data for the query image can be provided to a search system. Upon receipt of a query that includes the query image, the search system can access the result data for the query image. In turn, the search system can provide search results referencing the result images for the query image in a presentation order specified by the result data.

Figure 7:
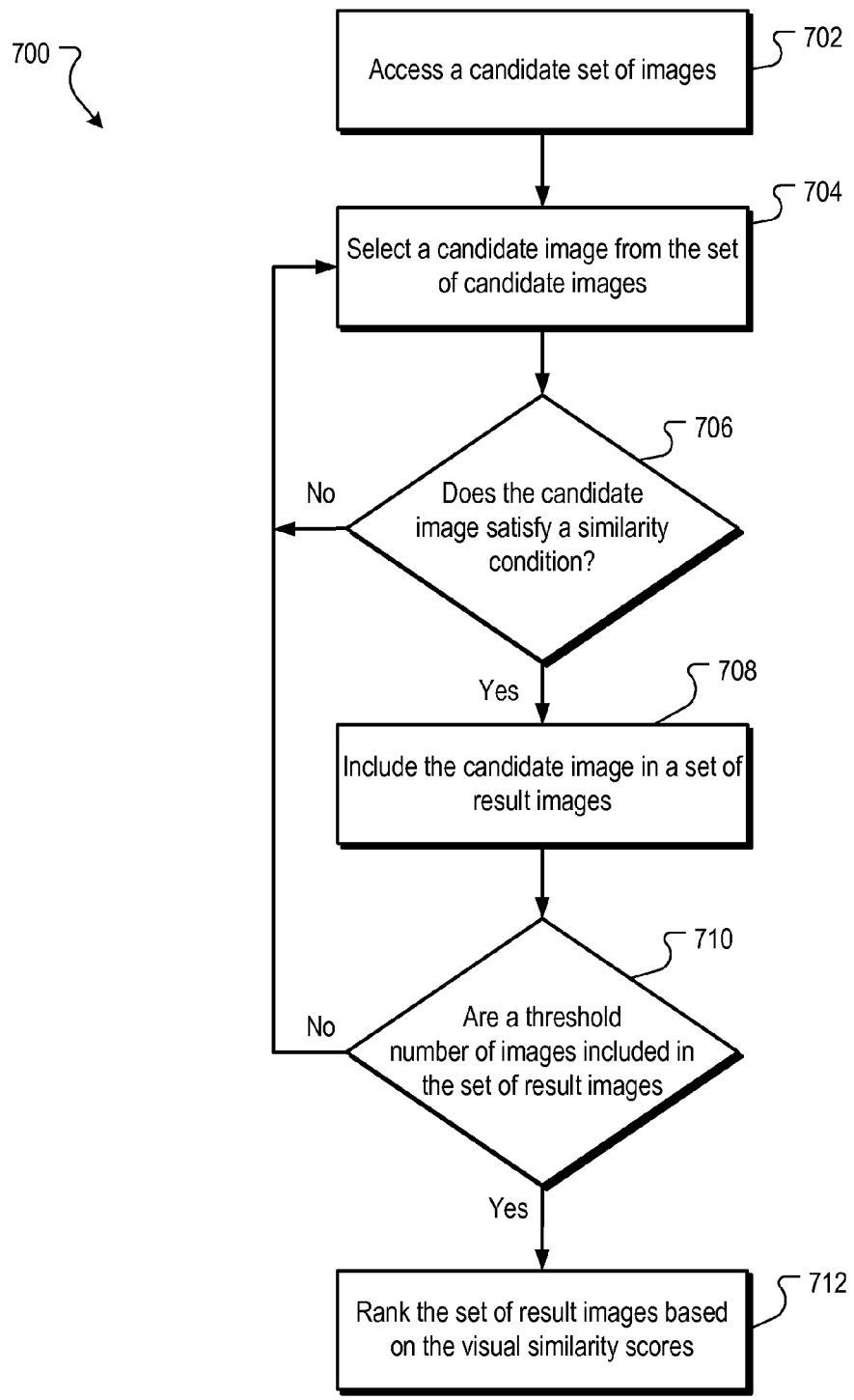
FIG. 7 is a flowchart of another example process for ranking images.

FIG. 7 is a flowchart of another example process 700 for ranking images. The process 700 can be used to rank images in a set of result images according to visual similarity scores. For example, the set of result images can be ranked in descending order of visual similarity score relative to the query image and based on the distance between their respective image similarity scores. The set of result images includes candidate images that satisfy a similarity condition. The similarity condition can require that a candidate image have a minimum similarity relative to the query image and/or other images in the set of result images to be included in the image rank. The process 700 can be implemented, for example, by the image relevance subsystem 122.

A set of candidate images are accessed (702). In some implementations, the set of candidate images are candidate images that are identified based on text queries of high confidence labels obtained for the query image. The candidate images can be accessed, for example, from a data store storing the candidate images referenced by the image search results responsive to the high confidence label text queries.

In some implementations, each candidate image has a visual similarity score that satisfies (i.e., meets or exceeds) an initial similarity threshold. The initial similarity threshold specifies a minimum visual similarity score relative to the query image that each image in the candidate set of images must have. For example, the initial similarity threshold can specify that each image have at least a minimum absolute visual similarity score, or a visual similarity score that is within a specified percentage of a specified score; or be a visual similarity score that is included in a top N number of identified scores.

A candidate image is selected from the set of candidate images (704). A determination is made whether the candidate image satisfies (i.e., meets or exceeds) a similarity condition (706). In some implementations, the similarity condition specifies a co-similarity condition that the candidate image have a minimum visual similarity to the query image as well as any images included in a set of result images for the query image. For example, the candidate image can be required to have a minimum image similarity score relative to the query image that is also within a specified value range of the image similarity scores of all images in the set of result images.

When the process 700 is initiated the set of result images is empty such that the first candidate image that is selected is only required to have the minimum image similarity score to the query image as specified by the co-distance condition. As no images are initially included in the set of result images, there are no result images against which the visual similarity score of the candidate image can be compared. When a result image is included in the set of result images, subsequently selected candidate images are required to have the minimum visual similarity score to the query image and be within a specified value range of the image similarity scores of other images that are in the set of result images. This co-distance condition is described in more detail with reference to FIG. 8A.

In some implementations, the similarity condition specifies a nearest neighbor condition that a candidate image must satisfy to be included in the set of result images. The nearest neighbor condition requires that a candidate image have a minimum number of nearest neighbors in common with the query image and each of the result images in the set of result images. The nearest neighbor condition can require a threshold number of nearest neighbors for the candidate image also be nearest neighbors of the query image. Additionally, the nearest neighbor condition can also require that the same or a different threshold number of nearest neighbors of the candidate image also be nearest neighbors of each image in the set of result images.

For example, the nearest neighbor condition can require that a candidate image have at least two of its six nearest neighbor images in common with the six nearest neighbors of the query image. Additionally, the nearest neighbor condition can require that the candidate image have at least two of its six nearest neighbor images in common with the six nearest neighbors of the query image and the six nearest neighbors of each image in the set of result images. The nearest neighbor condition is described in more detail with reference to FIG. 8B.

If the selected candidate image does not satisfy the similarity condition, another image candidate image is selected from the set of candidate images (704).

If the selected candidate image satisfies the similarity condition, the candidate image is included in a set of result images (708). The set of result images can be a set of images that are referenced by image search results for the query image. For example, data identifying the set of result images can be provided to a search system so that image search results can be generated to include references to the set of image results.

A determination is made whether a threshold number of images are included in the set of result images (710). In some implementations, the number of images that are included in the set of result images can correspond to the number of image search results that are provided by a search system in response to a user query. If the threshold number of images are not included in the set of result images, another candidate image is selected from the set of candidate images (704).

If the threshold number of images are included in the set of result images, the set of result images are ranked based on the visual similarity scores (712). In some implementations, the image search results can be ranked based on a relevance score that is a function of the image similarity score and the distance of the image similarity scores to higher ranked image result images. A linear decay function is an example of a function that can be used to weight the distances of the image similarity scores and the visual similarity distances. For example, the rank score of each image can be a difference between its image similarity score and a weighted sum of the distances to ranked result images.

Enforcement of the similarity conditions can improve the quality of the set of result images because the candidate images that are included in the set of result images are more likely to have similar visual characteristics. Thus, ranking image search results based on the rankings of the set of result images identified based on the similarity condition can facilitate more visually similar image search results.

For example, the result data for the query image can be provided to a search system. Upon receipt of a query that includes the query image, the search system can access the result data for the query image. In turn, the search system can provide search results referencing the result images for the query image in a presentation order specified by the result data.

Figure 8A:
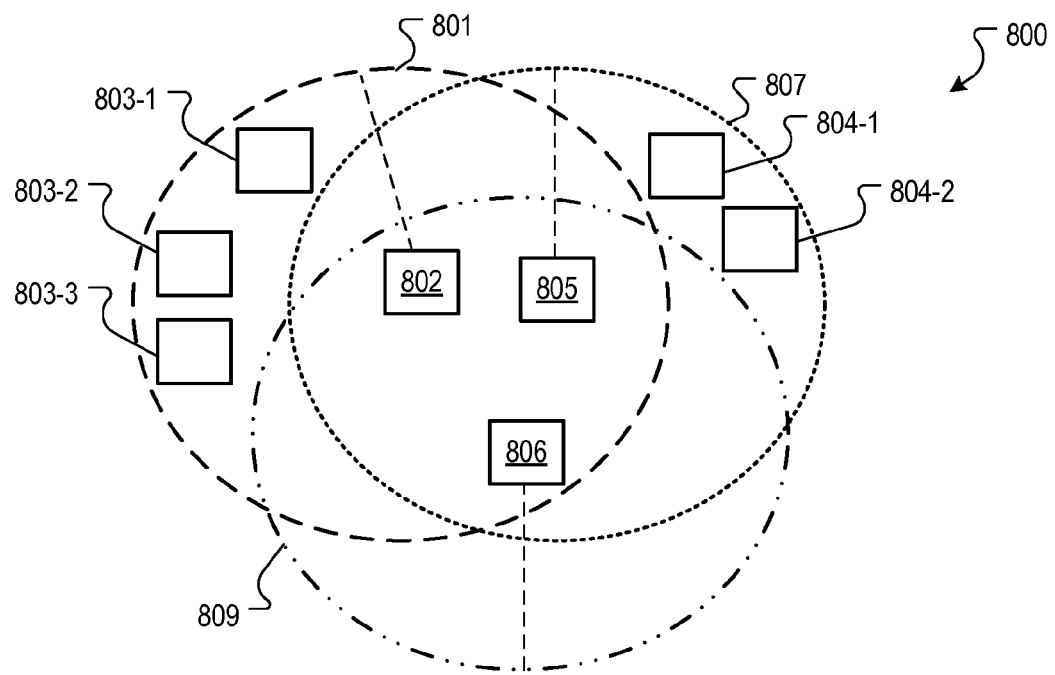
FIG. 8A is a conceptual illustration of a co-distance condition.
Figure 8B:
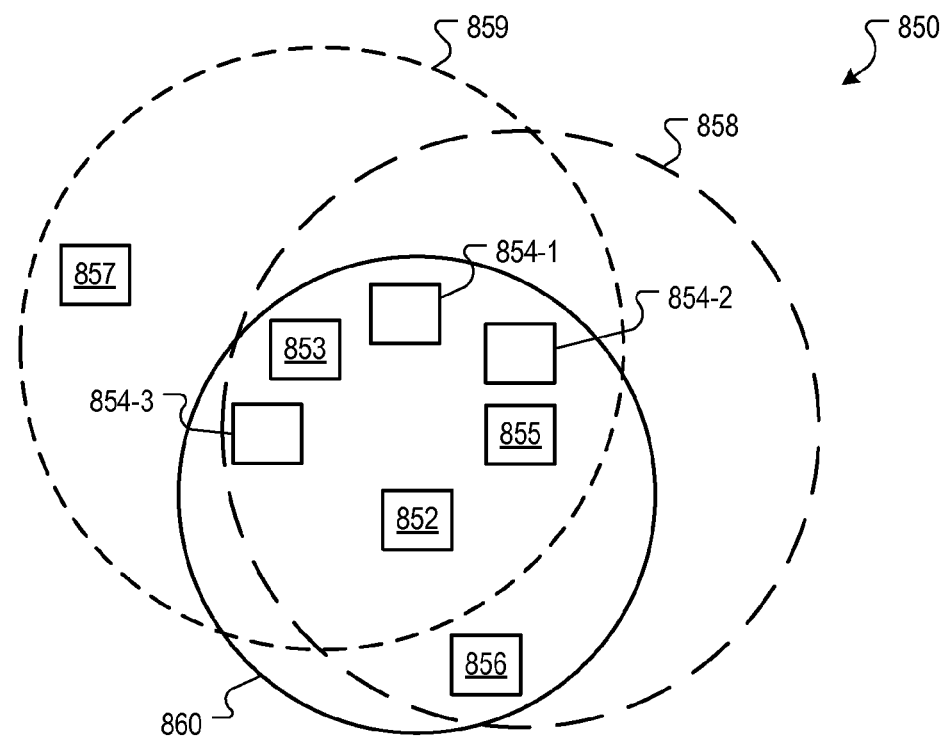
FIG. 8B is a conception illustration of a nearest neighbor condition.

FIGS. 8A and 8B are conceptual illustrations 800 and 850 of two similarity conditions. FIG. 8A is a conceptual illustration 800 of a co-distance condition. As described above, the co-distance condition can condition inclusion of a candidate image in the set of result images on the candidate image having a visual similarity score that is within a threshold distance of the query image and each result image in the set of result images.

In FIG. 8A, the square 802 represents the query image and each of the squares 803, 804, 805 and 806 represent candidate images that are positioned relative to the query image based on their image feature scores and/or visual similarity scores. Each of the candidate images 803, 804, 805 and 806 can be individually analyzed to determine whether the candidate image satisfies the co-distance condition. In some implementations, images are analyzed for inclusion in the set of result images in an order corresponding to their respective visual similarity scores to the query image. For example, the candidate image having the highest visual similarity score to the query image is analyzed first.

As described above, the set of result images can initially be empty such that the first candidate image selected for inclusion in the set of result images must only be within a threshold distance of the query image 802. The radius of the circle 801, which is a first similarity threshold, corresponds to the visual distance or minimum visual similarity score to the query image 802 that a candidate image must have to be included in the set of result images. Therefore, images having visual similarity scores relative to the query image 802 that are located within the circle 801 satisfy the minimum visual similarity score required by the co-distance condition with respect to the query image.

Candidate images 803-1, 803-2, 803-3, 805 and 806 are all within the circle 801 and, therefore, satisfy the minimum visual similarity score required for inclusion in the set of result images. However, candidate image 805 is the image most proximate to 802 and, therefore, most visually similar to the query image 802. Thus, candidate image 805 can be the first image selected for inclusion in the set of result images based on its proximity to the query image 802.

Once images are included in the set of result images, the co-distance condition of FIG. 8A also requires that a candidate image have a visual similarity score relative to the set of result images that is within specified value range. This requirement of the co-distance condition is represented by the circle 807. The radius of the circle 807 corresponds to the maximum distance between visual similarity scores of candidate images that can be included in the set of result images and the visual score for the result image 805.

The candidate images 804-1, 804-2 and 806 that are located within the circle 807 are within the maximum distance to the result image 805. Accordingly, each of the images 804-1, 804-2 and 806 could be result images if they also had image similarity scores that satisfy the minimum visual similarity score to the query image 802 specified by the co-distance. However, among the images 804-1, 804-2 and 806, only candidate image 806 has the minimum required image similarity score to the query image 802, it is the only image that satisfies the similarity condition. Thus, in this example, the image 806 is identified as a result image.

Once candidate image 806 is included in the set of result images, another circle 809 is specified by the co-distance condition. Additional candidate images must be within each of the circles 801, 807 and 809 to be included in the set of result images. Each new image that is included in the set of result images provides a new maximum distance for the co-distance condition.

FIG. 8B is a conceptual illustration 850 of a nearest neighbor condition, which is another similarity condition that can be used. As described above, a candidate image can be required to have a minimum number of nearest neighbors in common with the query image and other images in the set of result images in order for the candidate image to be included in the set of result images.

Square 852 represents the query image and each of the squares 853, 854, 855, 856 and 857 represent candidate images that are positioned relative to each other based on their image feature scores and/or visual similarity scores. The circles 858, 859 and 860 are conceptual representations of boundaries within which the 6 nearest neighbors for the images 855, 853 and 852 are respectively located.

As illustrated in FIG. 8B, each of the images 852, 853 and 855 each share the three images 854-1, 854-2 and 854-3 as nearest neighbors. Therefore, the candidate images 853 and 855 satisfy a nearest neighbor condition requiring a candidate image to have at least two nearest neighbors in common with the query image 852 to be included in the set of result images. Candidate image 855 is the image most proximate to the query image 852, and therefore, can be the first image selected to be analyzed for inclusion in the set of result images. The candidate image 855 and the query image 852 each share candidate images 854-1, 854-2 and 854-3 as nearest neighbors. Therefore, candidate image 855 satisfies the nearest neighbor condition relative to the query image 852. Since the set of query images is empty, candidate image 855 is only required to have a minimum number of nearest neighbors in common with the query image 852. Thus, candidate image 855 can be included in the set of result images and is identified as a result image.

Once candidate image 855 is included in the set of result images, the nearest neighbor condition can require additional candidate images to have the minimum number of nearest neighbors in common with the query image 852 and the image 855. Candidate image 853 also shares candidate images 854-1, 854-2, and 854-3 as nearest neighbor images with the query image 852 and result image 855. Therefore, candidate image 853 satisfies a nearest neighbor constraint requiring the candidate image to have at least two nearest neighbors in common with each of the query image 852 and the set of result images (i.e., result image 855) to be included in the set of result images. Thus, images 853 and 855 can each be identified as result images and included in a set of result images. The nearest neighbor condition can require additional candidate images to have a minimum number of nearest neighbors in common with the query image 852 and result images 853 and 855.

Requiring images to satisfy a nearest neighbor constraint can reduce the number of outlier images that are identified as relevant to the query image. For example, images that have a high percentage of nearest neighbors that are not nearest neighbors of other images that are identified as similar to the query image are likely not as similar to the query image as the visual similarity score suggests. Thus, ranking image search results based on rankings of images that satisfy a nearest neighbor constraint can facilitate presentation of more visually similar image search results.

Ranking Image Search Results

Figure 9:
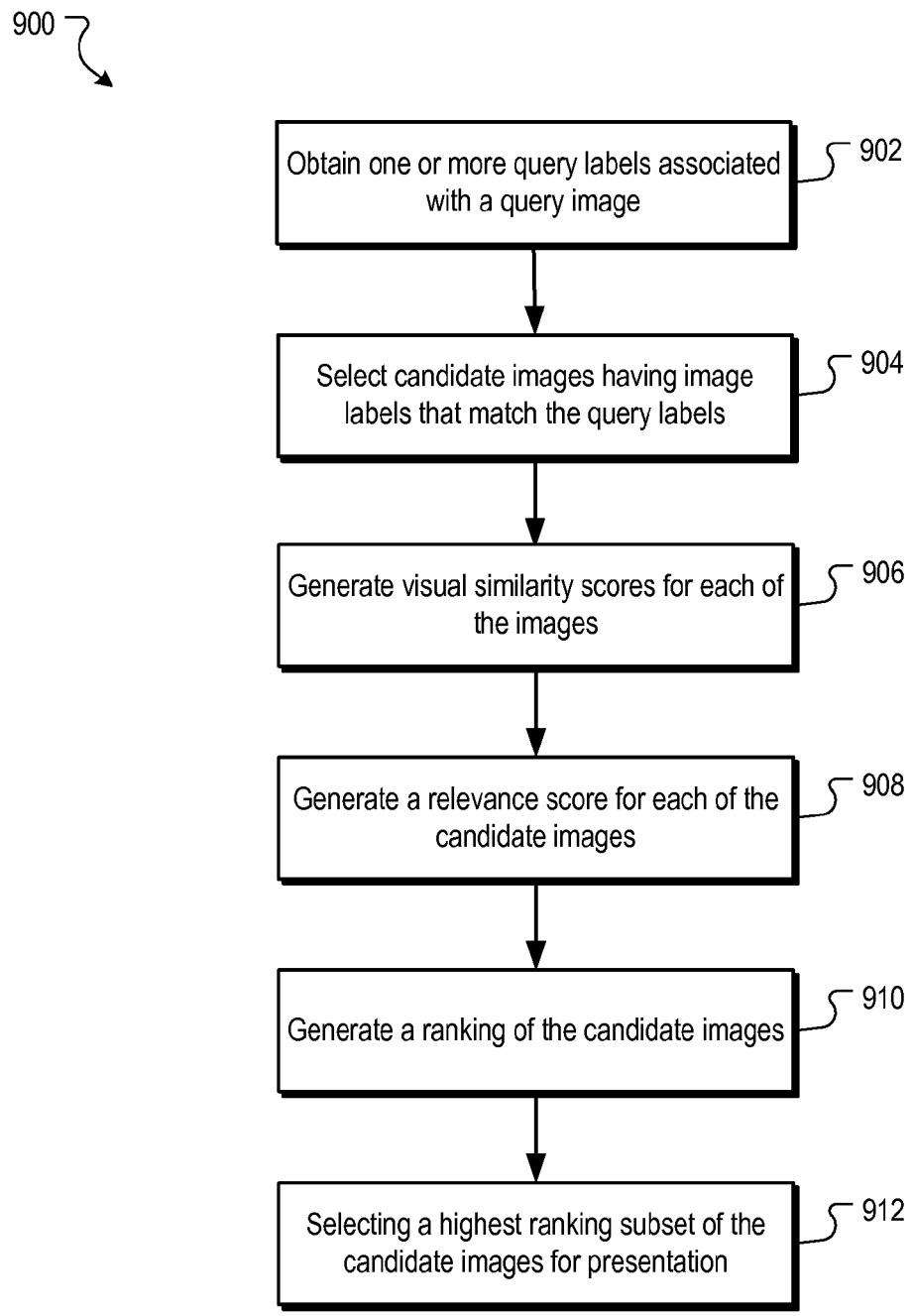
FIG. 9 is a flow chart of an example process for ranking image search results based on a query image.

FIG. 9 is a flow chart of an example process 900 for ranking image search results based on a query image. The process 900 can be implemented, for example, by the image search subsystem 120.

One or more query labels associated with a query image are obtained (902). The query image can be a single query image or a set of query images including two or more images. The query image and corresponding query labels can be obtained, for example, from an indexed cache 112.

In some implementations, the one or more query labels can be high confidence query labels similar to those described above with reference to the image labels subsystem 126. If query labels and/or high confidence query labels are not accessible for the query image, the query image can be provided to a system that can generate labels and/or high confidence labels, such as the image labels subsystem 126.

Candidate images that match the query labels are selected in a data processing system (904). The candidate images can be identified, for example, based on image search results provided by a search system. For example, the query labels can be provided to the search system as text queries for an image search. The search system can provide image search results responsive to the query labels. The images referenced by the image search results can be identified as the candidate images.

In some implementations, the candidate images are images having labels that match the query label. A candidate image can have a label that is an exact match of the query label. Similarly, a candidate image can have a label that matches the query label based on query expansion techniques. For example, the candidate image can have a label that is a plural or past tense version of the query label. The candidate image can also have a label that is a synonym, stem, gerund, or another variation (e.g., a translated version) of the query label.

Visual similarity scores are generated, in a data processing system, for each of the candidate images (906). Each visual similarity score represents the visual similarity of the candidate image relative to the query image. The visual similarity scores can be generated, for example, based on image feature scores of each of the candidate images relative to image feature scores of the query image, as described above with reference to the image similarity subsystem 124.

In some implementations, each of the image feature scores are identified at two or more image scales. For example, image feature scores can be identified for a full resolution version of an image and for a lower and/or higher resolution version of the image. Identifying image feature scores for images at various resolution levels can facilitate identification of visual similarities between images even when the images have different resolution characteristics. The visual similarity scores can also be generated based on similarity feedback data provided by users, as described above with reference to FIGS. 2 and 3.

In some implementations, the visual similarity score for a candidate image can be amplified by a boost factor based on a common distinct set of image feature values being identified for the candidate image and the query image, as described above with reference to FIG. 2. The visual similarity scores can be generated, for example, by the image similarity subsystem 124.

A relevance score is generated, in a data processing system, for each candidate image (908). Each relevance score represents a relevance measure for the candidate image relative to the query image. In some implementations, the relevance score can be set as the visual similarity score. In some implementations, the relevance score is a result of a function of the visual similarity score. For example, the relevance score can be boosted, scaled or otherwise transformed for use by other processing systems, e.g., a search system.

In some implementations, the candidate images can be ranked based on the relevance scores. For example, the candidate images can be ranked in descending order according to the relevance scores. In some implementations, a candidate image can be ranked based on the candidate image including a dominant characteristic. For example, a candidate image can be analyzed to identify whether the candidate image includes the dominant characteristic. If the candidate image includes the dominant characteristic, the candidate image can be selected to be ranked according to its relevance score. Selecting candidate images including the dominant characteristic can increase the homogeneity of ranked images.

A ranking of the candidate images is generated in the data processing system (910). In some implementations, the candidate images are ranked based on the relevance scores corresponding to the candidate images. For example, the candidate images can be ranked in descending order according to the relevance scores associated with the respective candidate images. The candidate images can be ranked, for example, by the image search subsystem and/or the image relevance subsystem 122.

A highest ranking subset of the candidate images is selected for presentation (912). In some implementations, the highest ranking subset of candidate images is a subset of candidate images having a highest X number of relevance scores. The highest ranking subset of candidate images can be selected, for example, by the image relevance subsystem 122.

Embodiments of the subject matter and the operations described in this specification can be implemented in digital electronic circuitry, or in computer software, firmware, or hardware, including the structures disclosed in this specification and their structural equivalents, or in combinations of one or more of them. Embodiments of the subject matter described in this specification can be implemented as one or more computer programs, i.e., one or more modules of computer program instructions, encoded on a computer storage medium for execution by, or to control the operation of, data processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer storage medium can be, or be included in, a computer-readable storage device, a computer-readable storage substrate, a random or serial access memory array or device, or a combination of one or more of them. Moreover, while a computer storage medium is not a propagated signal, a computer storage medium can be a source or destination of computer program instructions encoded in an artificially-generated propagated signal. The computer storage medium can also be, or be included in, one or more separate physical components or media (e.g., multiple CDs, disks, or other storage devices).

The operations described in this specification can be implemented as operations performed by a data processing apparatus on data stored on one or more computer-readable storage devices or received from other sources.

The term "data processing apparatus" encompasses all kinds of apparatus, devices, and machines for processing data, including by way of example a programmable processor, a computer, a system on a chip, or multiple ones, or combinations, of the foregoing The apparatus can include special purpose logic circuitry, e.g., an FPGA (field programmable gate array) or an ASIC (application-specific integrated circuit). The apparatus can also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment can realize various different computing model infrastructures, such as web services, distributed computing and grid computing infrastructures.

A computer program (also known as a program, software, software application, script, or code) can be written in any form of programming language, including compiled or interpreted languages, declarative or procedural languages, and it can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform actions by operating on input data and generating output. The processes and logic flows can also be performed by, and apparatus can also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer can be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few. Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Embodiments of the subject matter described in this specification can be implemented in a computing system that includes a back-end component, e.g., as a data server, or that includes a middleware component, e.g., an application server, or that includes a front-end component, e.g., a client computer having a graphical user interface or a Web browser through which a user can interact with an implementation of the subject matter described in this specification, or any combination of one or more such back-end, middleware, or front-end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

While this specification contains many specific implementation details, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the invention have been described. Other embodiments are within the scope of the following claims. In some cases, the actions recited in the claims can be performed in a different order and still achieve desirable results. In addition, the processes depicted in the accompanying figures do not necessarily require the particular order shown, or sequential order, to achieve desirable results. In certain implementations, multitasking and parallel processing may be advantageous.

What is claimed is:

1. A computer-implemented method, comprising:
    accessing a plurality of images referenced by initial image search results responsive to a query image, each of the plurality of images having a visual similarity score that satisfies an initial similarity threshold, the visual similarity score being generated by an image similarity model that has been trained based on user similarity feedback from a plurality of users and feature distances between images referenced by the user similarity feedback, the user similarity feedback specifying a reference query image and a first of two training images that was identified, by the plurality of users, as more visually similar than a second of the two training images to the reference query image, each of the feature distances indicative of a visual distance between corresponding image feature scores for the reference query image and the first of the two training images;

selecting, in a data processing system and as a result image for the query image, a first image from the plurality of images, the first image having a visual similarity score that satisfies a first similarity threshold, the first similarity threshold being more selective than the initial similarity threshold;

determining that a second image from the plurality of images has a first degree of visual similarity relative to the query image;

determining that the second image from the plurality of images has a second degree of visual similarity relative to the first image from the plurality of images;

determining, based on the first degree of visual similarity and the second degree of visual similarity, that the second image satisfies a similarity condition specifying required degrees of visual similarity between the second image, the query image, and the first image; and selecting, in the data processing system and as another result image for the query image, the second image from the plurality of images in response to determining that the second image satisfies the similarity condition, wherein a result image is an image for which a reference to the image is identified as a final image search result for the query image.

2. The method of claim 1, wherein the determining that the second image satisfies the similarity condition comprises identifying a second image having a visual similarity score that satisfies a second similarity threshold with reference to the query image and a third similarity threshold with reference to the first image.

3. The method of claim 2, further comprising:
iteratively identifying other second images based on the similarity condition until a threshold number of second images are identified.

4. The method of claim 1, wherein the selecting the first image comprises identifying as the first image, an image having at least a first threshold number of nearest neighbors that are also nearest neighbors of the query image, a nearest neighbor of an image being another image having a visual similarity score relative to the image that satisfies a nearest neighbor threshold.

5. The method of claim 4, further comprising identifying, as the second image, an image having at least a second threshold number of nearest neighbors that are also nearest neighbors of the first image and the query image.

6. The method of claim 5, wherein the first threshold number and the second threshold number of the nearest neighbors are equal.

7. The method of claim 1, further comprising selecting a dominant image characteristic for the plurality of images, the dominant image characteristic being an image characteristic that is included in a threshold number of the plurality of images;
filtering the plurality of images based on the dominant image characteristic; and
identifying the filtered plurality of images as result images for the query image.

8. The method of claim 7, wherein the filtering the plurality of images comprises:
for each of the plurality of images:
analyzing image feature scores of the image to identify whether the image contains the dominant image characteristic; and
removing the image from the plurality of images when the dominant image characteristic is not identified from the image feature scores.

9. A computer system, comprising:
a data store storing a plurality of images referenced by initial image search results responsive to a query image, each of the plurality of images having a visual similarity score that satisfies an initial similarity threshold, the visual similarity score being generated by an image similarity model that has been trained based on user similarity feedback from a plurality of users and feature distances between images referenced by the user similarity feedback, the user similarity feedback specifying a reference query image and a first of two training images that was identified, by the plurality of users, as more visually similar than a second of the two training images to the reference query image, each of the feature distances indicative of a visual distance between corresponding image feature scores for the reference query image and the first of the two training images; and
one or more computers that interact with the data store and identify final result images for the query image, the final result images including at least a first image and a second image, wherein the one or more computers determine a first degree of visual similarity between the first image and the query image, identify the first image as a final result image based on the first degree of visual similarity satisfying a first similarity threshold, determine a second degree of visual similarity between a second image and the first image, and identify the second image as another final result image based on the second degree of visual similarity meeting a required degree of similarity between the second image and the first image and based on the second image having a third degree of visual similarity, relative to the query image, that meets the first similarity threshold.

10. The system of claim 9, wherein the one or more computers are configured to identify the second image having a visual similarity score that satisfies a second similarity threshold to the query image and a third similarity threshold to the first image.

11. The system of claim 10, wherein the one or more computers are configured to iteratively identify an additional second image of the final result images until a threshold number of second images are identified.

12. The system of claim 9, wherein the one or more computers identify the final result images based on a similarity condition requiring:
at least a first threshold number of nearest neighbors of the first image being nearest neighbors of the query image, a nearest neighbor of an image being another image having a visual similarity score relative to the image that satisfies a nearest neighbor threshold; and
at least a second threshold number of nearest neighbors of the second image being nearest neighbors of the first image.

13. The system of claim 12, wherein the first threshold number and the second threshold number of the nearest neighbors are equal.

14. The system of claim 9, further comprising a user device, wherein the one or more computers are configured to interact with the user device.

15. The system of claim 9, wherein the one or more computers are configured to:
- select a dominant image characteristic for highest ranking candidate images and select the final result images for the query image based on the dominant image characteristic, the dominant image characteristic being an image characteristic that is included in a threshold number of a highest ranking subset of the candidate images;
- determine candidate images from the highest ranking subset of the candidate images that do not include the dominant characteristic; and
- remove the candidate images that do not include the dominant characteristic from the highest ranking subset of candidate images.

\* \* \* \* \*